US012582140B2

(12) United States Patent
Ray et al.

(10) Patent No.: US 12,582,140 B2
(45) Date of Patent: Mar. 24, 2026

(54) METHOD OF PREPARING CASEIN HYDROLYSATE

(71) Applicant: Arla Foods amba, Viby J (DK)

(72) Inventors: Colin A. Ray, Viby J (DK); Guilherme De Moura Maciel, Viby J (DK); Jørgen Andersen, Viby J (DK); Xiaolu Geng, Viby J (DK); Honggang Huang, Viby J (DK)

(73) Assignee: Arla Foods amba, Viby J (DK)

( * ) Notice: Subject to any disclaimer, the term of this patent is extended or adjusted under 35 U.S.C. 154(b) by 354 days.

(21) Appl. No.: 18/004,257

(22) PCT Filed: Jul. 6, 2021

(86) PCT No.: PCT/EP2021/068699
§ 371 (c)(1),
(2) Date: Jan. 4, 2023

(87) PCT Pub. No.: WO2022/008531
PCT Pub. Date: Jan. 13, 2022

(65) Prior Publication Data
US 2023/0276827 A1 Sep. 7, 2023

(30) Foreign Application Priority Data
Jul. 6, 2020 (EP) .................................... 20184247

(51) Int. Cl.
*A23J 3/34* (2006.01)
*A23L 33/18* (2016.01)

(52) U.S. Cl.
CPC .............. *A23J 3/344* (2013.01); *A23L 33/18* (2016.08)

(58) Field of Classification Search
CPC . A23L 33/30; A23L 2/38; A23L 2/395; A23L 29/045; A23L 33/18; A23L 33/19; A61K 9/2013; A61K 31/522; A61K 9/1617; A23J 3/344; A61P 37/00; A23V 2002/00; A23V 2250/54246; A23V 2300/24; A23V 2300/26; A23V 2300/28
See application file for complete search history.

(56) References Cited

U.S. PATENT DOCUMENTS

| | | | |
|---|---|---|---|
| 2005/0095316 A1 | 5/2005 | De Greeftrial et al. | |
| 2011/0045130 A1 | 2/2011 | Edens et al. | |
| 2012/0142587 A1* | 6/2012 | Minor ..................... | A23L 33/16 514/5.6 |

| | | | |
|---|---|---|---|
| 2017/0037442 A1 | 2/2017 | Fitzgerald et al. | |
| 2018/0160715 A1† | 6/2018 | Lambers | |
| 2020/0103412 A1 | 4/2020 | Trowell et al. | |

FOREIGN PATENT DOCUMENTS

WO WO-2019038392 A1 * 2/2019 ............... A23C 3/02

OTHER PUBLICATIONS

Anema, Skelte G. "Storage stability and age gelation of reconstituted ultra-high temperature skim milk" International Dairy Journal, 2017, pp. 56-57, vol. 75.
European Search Report for EP 20184247 dated Oct. 8, 2020.
International Search Report for PCT/EP2021/068699 dated Oct. 13, 2021.
Caessens, Petra W.J.R. et al., "Plasmin Hydrolysis of β-Casein: Foaming and Emulsifying Properties of the Fractionated Hydrolysate" J. Agric. Food Chem., 1997, pp. 2935-2941, vol. 45.
Raak, Norbert et al., "Hydrolysis by Indigenous Plasmin: Consequences for Enzymatic Cross-Linking and Acid-Induced Gel Formation of Non-Micellar Casein" Food Biophysics, 2020, pp. 32-41, vol. 15.
"Takayoshi Aoki et al., *Agricultural and Biological Chemistry*, 1975, 49(2), 107-112".
Schiffer, Simon et al., "Effect of Pre-Heating Prior to Low Temperature 0.1 μm-Microfiltration of Milk on Casein-Whey Protein Fractionation" Foods, 2021, pp. 1-13, vol. 10, No. 1090.
Communication pursuant to Article 94(3) EPC issued in EP 21740036.5 dated Oct. 21, 2025.
Benfeldt, Connie et al., "Heat Treatment of Cheese Milk: Effect on Plasmin Activity and Proteolysis During Cheese Ripening" Int. Dairy Journal, 1997, pp. 723-731, vol. 7.
Reference Manual for U.S. Milk Powders and Microfiltered Ingredients, Think USA Dairy, U.S. Dairy Export Council (2018). Available at www.thinkusdairy.org/assets/documents/Customer%20Site/C3-Using%20Dairy/C3.7-Resources%20and%20Insights/02-Product%20Resources/USD5163-US-Milk-Powders_LIVE_Web.pdf.†
Gazi, I. et al. "Plasmin activity and proteolysis in milk protein ingredients", International Dairy Journal vol. 38, pp. 208-212 (2014).†

* cited by examiner
† cited by third party

*Primary Examiner* — Erik Kashnikow
*Assistant Examiner* — Janice Y Silverman
(74) *Attorney, Agent, or Firm* — Knobbe Martens Olson & Bear, LLP

(57) ABSTRACT

The present invention relates to a method of preparing a casein hydrolysate by hydrolysis of casein with endogenous plasmin, and the casein hydrolysate obtainable by the method. In particular, the present invention relates to a method of preparing a casein hydrolysate without adding any exogenous enzymes such that an organic casein hydrolysate is obtained.

11 Claims, 11 Drawing Sheets

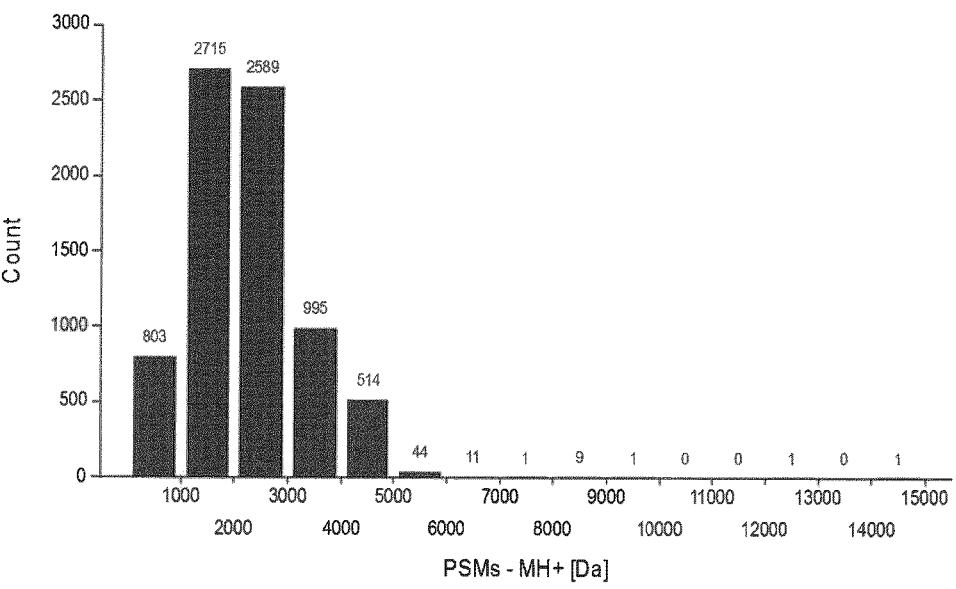
Fig 12
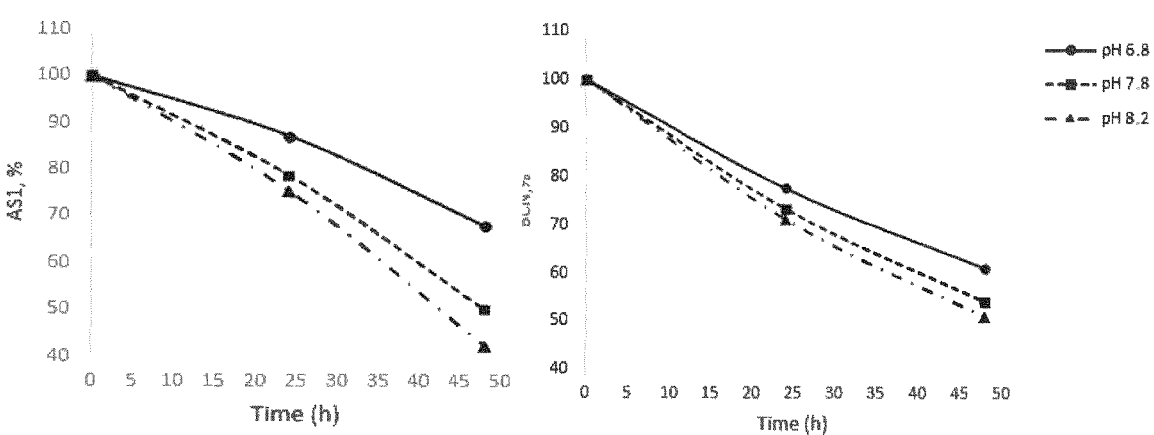
Fig 13A                    Fig 13B

METHOD OF PREPARING CASEIN HYDROLYSATE

CROSS REFERENCE TO RELATED APPLICATIONS

This application is a U.S. National Phase Application of PCT International Application Number PCT/EP2021/068699, filed on Jul. 6, 2021, designating the United States of America and published in the English language, which is an International Application of and claims the benefit of priority to European Patent Application No. 20184247.3, filed on Jul. 6, 2020. The disclosures of the above-referenced applications are hereby expressly incorporated by reference in their entireties.

TECHNICAL FIELD OF THE INVENTION

The present invention relates to a method of preparing a casein hydrolysate prepared by hydrolysis of casein with endogenous plasmin, and the casein hydrolysate obtainable by the method. In particular, the present invention relates to a method of preparing a casein hydrolysate wherein a liquid solution comprising casein and endogenous plasmin is heat treated at a pH, temperature and time period sufficient for obtaining a casein hydrolysate. The liquid solution comprising casein and endogeneous plasmin comprises at least 80% by weight casein of the total solid content and whey protein in an amount of maximum 10% by weight of the total protein content.

BACKGROUND OF THE INVENTION

The composition of human milk is the biologic norm for infant nutrition and human milk is uniquely suited to the human infant, both in its nutritional composition and in the nonnutritive bioactive factors that promote survival and healthy development. Exclusive breast feeding during the first six months after birth is recommended by the World Health Organization (WHO), and efforts are made to support and promote breast feeding amongst mothers worldwide. However, when a mother is unable to or chooses not to breast feed, it is necessary to feed an infant with a suitable substitute nutritional composition, such as an infant formula. Hence, there is a need for preparing non-human infant nutrition, such as infant formulations, that provide a protein composition close to that of human milk.

The proteins of human milk are divided into two groups: the whey proteins and the casein proteins. Approximately 40% of the proteins in human milk are casein, while 60% is whey protein. The principal proteins of human milk are casein proteins that are homologous to bovine beta-casein, alpha-lactalbumin, lactoferrin, immunoglobulin IgA, lysozyme, and serum albumin. Alpha-lactalbumin, lactoferrin and serum albumin are whey proteins.

The casein composition of human and bovine milk differs in that human milk comprises for the most part beta and kappa caseins and although α-S1 casein is found in human milk, it is only present in trace amounts (3-500 μg/mL) and is therefore unlikely to function as a source of amino acids.

Human milk also comprises a variety of endogenous enzymes, such as plasmin, cathepsin and elastase, and research has shown that the proteolytic action of some of these enzymes in human milk results in the generation of hundreds of peptides.

Pepsin, which is the major gastric protease enzyme, is known to be present in the stomach of a neonate by 26 weeks function, optimally at acidic pH, and is denatured at pH 7. However, for several weeks post-partum in full term infants, gastric pH has been found to be 5-7 for up to an hour post-digestion, due to the low production of acid in the infant stomach. Combined with the buffering capacity of milk, this has lead to the hypothesis that very little pepsin induced proteolysis occurs in the infant stomach which may result in a sub-optimal uptake of amino acids. The action of endogenous milk proteases on casein may compensate for the lack of pepsin activity in the neonatal GI tract, resulting in the availability of amino acids from casein as a source of nutrition as well as function.

Hence, human milk comprises hydrolysed milk proteins, such as hydrolysed casein and there is a need in the art of a method to prepare such casein hydrolysate.

As stated previously, the action of endogenous protease enzymes in human milk take effect in the mammary gland, and of these enzymes, plasmin is a major contributor. Prior art has discussed that 32% of the peptides identified in human milk originated from β-casein and 10% from αS-1 casein. Further, it has been discussed in prior art that the predominance of peptides in human milk originates from the action of plasmin on β-casein. Prior art has also discussed that human milk contains more peptides than bovine milk (given by a higher total ion intensity, $7.62 \times 10^{11}$ for human milk versus $1.19\lambda 10^{11}$ for bovine milk). This reinforces the fact that there is a need for improved infant formula products wherein the abundance of plasmin derived casein peptides is higher, and thus closer to that found in human milk.

Casein hydrolysates prepared from enzymatic hydrolysis of casein proteins are known in the art, but all these known methods of enzymatically preparing protein hydrolysate uses addition of exogenous proteases. US 2018/0160715 A1, for example, discloses a method of preparing protein hydrolysates for use in pediatric nutritional compositions. US 2018/0160715 A discloses hydrolysis of casein by addition of exogenous proteases such like trypsin (trypsin-like), chymotrypsin (chymotrypsin-like), pepsin and/or plasmin to a casein containing slurry.

However, it is desirable to avoid the use of exogenous enzymes in order to ease regulatory requirements associated with the use of exogenous proteases and allow development of organic infant formula products.

Hence, an improved method of preparing a casein hydrolysate would be advantageous, and in particular, a more efficient method of preparing a casein hydrolysate without adding any exogenous enzymes would be advantageous. Furthermore, a method of preparing a casein hydrolysate having a peptide profile closer to that of human milk, such as a casein hydrolysate having an accumulation of peptides closer to that of human milk, would also be advantageous.

SUMMARY OF THE INVENTION

Thus, an object of the present invention relates to preparing a casein hydrolysate by avoiding the use of adding any exogenous protease. It is an object of the present invention to provide an optimised method of preparing a casein hydrolysate by hydrolysing casein with endogeneous plasmin such that casein rapidly and efficiently is hydrolysed without any gelation, aggregation or precipitation of the casein hydrolysate during storage, and up to at least one year storage. Further, it is an object of the present invention to prepare casein hydrolysates that have an accumulation of peptides closer to that of human milk.

Furthermore, it is an object of the present invention to provide a casein hydrolysate, wherein some of the peptides have documented biological activity, for example antimicrobial activity and ACE-inhibitory activity.

It has surprisingly been found by the inventors of the present invention that a casein hydrolysate can rapidly and efficiently be obtained without using any exogenous enzymes, but where hydrolysis is obtained by using endogenous plasmin. It was surprisingly found that endogenous plasmin was not inactivated during heat treatment in a system comprising a high amount of amount of casein, such as a for example a micellar casein isolate, and not even after an extensive heat treatment, such as for example ultra high temperature heat treatment at a temperature above 120° C. for 3-5 seconds. This invention thus allows a downstream sterile incubation of a micellar casein isolate at pH and temperature optimal for plasmin activity without any inherent microbial risk. Also, it was found that it was possible to rapidly and efficiently prepare a casein hydrolysate without adding any exogenous enzymes by optimising hydrolysis parameters, such as pH, temperature, and components present in the feed used for the hydrolysis (such as the content of casein, whey protein and calcium). This new method of preparing a casein hydrolysate further has the advantage of being closer in the accumulation of peptides to that of mother's milk. Thus, the use of a casein hydrolysate obtained by hydrolysis with endogeneous plasmin of for example a micellar casein isolate (MCI) would result in an infant formula product, wherein the amount of peptides originating from casein would be far closer to that observed for human milk than is seen in commercial infant formula products today.

The term "accumulation of peptides" refers to the increase in relative peak area of the peptides over the course of the hydrolysis in a sample as given by HPLC. The accumulation of peptides is observed in the regions of 12-14 min, 16.5 min and 17-18 min on HPLC chromatograph. In other words the accumulation of peptides occurs as a function of time and plasmin activity. The amino acids in the peptides present in the casein hydrolysate of the present invention is not identical in amino acid sequence of the peptides in human milk, but more reflects human milk in terms of peptide accumulation. A concomitant loss of intact casein protein is calculated in the same way, via a decrease in the peak area of a given casein by HPLC as a function of time.

The present invention also allows for preparing an organic casein hydrolysate if the liquid source of casein and plasmin, such as micellar casein isolate, is organic.

Thus, one aspect of the invention relates to a method of preparing a casein hydrolysate comprising the following steps:
  i) providing a liquid solution comprising casein and endogenous plasmin, wherein the liquid solution comprises at least 80% by weight casein of the total solid content and wherein the liquid solution comprises whey protein in an amount of maximum 10% by weight of the total protein content,
  ii) adjusting the pH of the solution of step i) to a pH 7.2 to 9,
  iii) subjecting the pH adjusted solution to a first heat treatment step to inactivate microorganisms;
  iv) subjecting the solution of step iii) to a second heat treatment at a temperature of from 25° C. to 45° C. for at least 6 hours to obtain a casein hydrolysate.

Another aspect of the present invention relates to a natural casein hydrolysate obtainable by the method according to the invention.

Yet another aspect of the present invention is to provide a natural casein hydrolysate, wherein the casein hydrolysate does not comprise added exogenous enzymes.

Still another aspect of the present invention is to use the natural casein hydrolysate according to the invention in a nutritional composition.

BRIEF DESCRIPTION OF THE FIGURES

FIG. 1 shows the plasmin derived peptides eluting from 12.00-14.00 minutes on RP-HPLC.

FIG. 2 shows the plasmin derived peptides eluting from 17.00-18.00 minutes on RP-HPLC.

FIG. 12 shows the molecular weight distribution of a casein hydrolysate of the invention.

FIG. 13A shows the loss of intact alpha-S1 casein determined by RP-HPLC over time for samples having different pH-value. The y-axis is normalised to peak area of alpha-S1 casein at t=0 immediately prior to incubation.

FIG. 13B shows the loss of intact beta-casein determined by RP-HPLC over time for samples having different pH-value. The y-axis is normalised to peak area of beta-casein at t=0 immediately prior to incubation.

Figure 1:
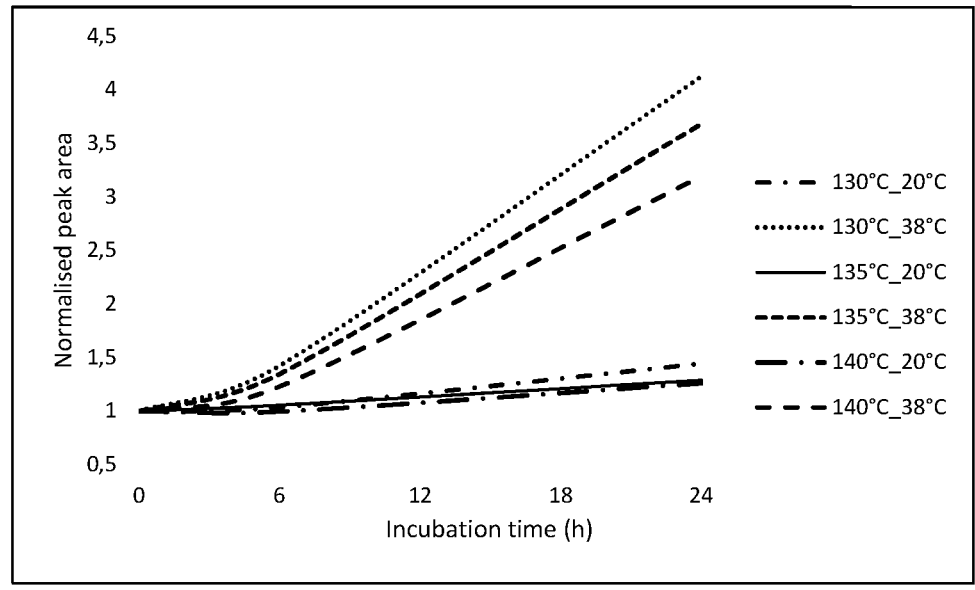
FIG. 1 shows the influence of the temperature of the first heat treatment step on the evolution of plasmin derived peptides in 8% w/v MCI solution.

The present invention will now be described in more detail in the following.

DETAILED DESCRIPTION OF THE INVENTION

Definitions

Prior to discussing the present invention in further details, the following terms and conventions will first be defined:

All references to singular characteristics or limitations of the present invention shall include the corresponding plural characteristic or limitation, and vice versa, unless otherwise specified or clearly implied to the contrary by the context in which the reference is made.

All percentages referred to herein are percentages by weight unless otherwise stated. Also, the terms "by weight of dry matter" and "on dry matter basis" refer to the same concept and are used interchangeably.

The term "w/w" as in for example 1% w/w refers to a composition comprising 1% by weight of a compound.

The term "liquid solution" means in the context of the present invention a product having a moisture content of at least 60% by weight, such as a moisture content of at least 70% by weight, and preferably at least 80% by weight. Preferably, the moisture content in the "liquid solution" of the present invention is from 80 to 96% by weight, and in particular from 85 to 95% by weight.

In the context of the present invention, the term "w/v" as in amount casein in the liquid solution means: the weight percentage of casein per volume of feed material. For example, 1% w/v of casein in the liquid solution means 1 g casein per 100 ml liquid solution, or 10 g casein per 1 litre liquid solution.

In the context of the present invention, the term "casein hydrolysate" or "hydrolysed proteins" means a composition comprising casein proteins that has been subjected to protein hydrolysis. By protein hydrolysis, the protein is cleaved into peptides and free amino acids, and therefore, the "hydrolysed proteins" comprises peptides and/or free amino acids.

The term "endogenous" as in endogenous plasmin refers to the enzyme plasmin being naturally occurring in the source of casein protein used for the hydrolysis. Contrary to "endogenous", the term "exogenous" refers to an enzyme not being naturally occurring, but being individually added.

In the context of the present invention, the term "solid" relates to the molecules that would remain if all water was removed from the milk. The term "solid" includes proteins, enzymes (plasmin or plasminogen), milk fat, carbohydrates, mineral, vitamins and other small, non-water molecules.

Casein:

Casein is a milk protein that is found in milk as a suspension of particles, called casein micelles. The caseins in the micelles are held together by calcium ions and hydrophobic interactions.

In human milk, about 40% of the proteins are casein, while about 80% of the milk proteins in bovine milk is casein.

Casein may be found in different forms for example alpha-casein and beta-casein. Also, beta-casein may be found in the variants A1 beta-casein and A2 beta-casein. A1 and A2 beta-casein are genetic variants of the beta-casein milk protein that differ by one amino acid; a proline occurs at position 67 in the chain of amino acids that make up the A2 beta-casein, while in A1 beta-casein a histidine occurs at that position. Due to the way that beta-casein interacts with enzymes found in the digestive system, A1 and A2 are processed differently by digestive enzymes. However, in the present invention, both A1 and A2 beta-caseins can be used.

Hence, in the context of the present invention, the term "casein" refers to any type of casein, such as acid casein, beta-casein, beta-enriched casein, alpha-casein, alpha-enriched casein, kappa-casein and kappa-enriched casein. However, in an embodiment of the invention, the term "casein" does not cover caseinates. Caseinates have been found to have negligible plasmin activity.

In a preferred embodiment of the invention, the casein is alpha-casein and/or beta-casein.

In an embodiment of the present invention, the liquid solution provided in step i) comprises casein in an amount of at least 1% w/v.

In order to prepare a casein hydrolysate, a sufficient amount of casein should be present in the liquid solution. In a preferred embodiment of the invention, the liquid solution therefore comprises casein in an amount of at least 3.0% w/v such as at least 4% w/v, more preferably at least 5% w/v and even more preferably at least 6% w/v.

The casein content should not be more than 20% by weight, since a higher content of casein will provide gelling of the liquid solution during the heat treatment, such that the solution becomes viscous and hence difficult to process.

Hence, in a further embodiment of the invention, the liquid solution comprises casein in an amount in the range of 1% to 20% w/v, such as 3.0% to 17% w/v of casein in the liquid solution, preferably 4% to 15% w/v of casein in the liquid solution. In a preferred embodiment of the invention, the liquid solution comprises casein in an amount in the range of 1% to 15% w/v.

The casein content in the liquid solution should preferably be at least 90% by weight of the total protein content, such as at least 93% by weight of the total protein content and event more preferably at least 95% by weight of the total protein content.

The liquid solution comprising casein and endogenous plasmin should preferably not comprises any whey protein. If whey protein is present, it is in an amount of not more than 10% by weight of the total protein content.

Plasmin is far less active on whey proteins and can therefore not hydrolyse/cleave whey proteins into peptides and free amino acids. Plasmin is active on casein. Furthermore, whey proteins inactivate plasmin. Unfolded and denatured whey proteins (mainly beta-lactoglobulins) bind to plasmin (by disulphide bonds) close to the active site of plasmin and thereby inactivating the plasmin. If whey proteins are present in the liquid solution in high amounts, the plasmin activity is significantly affected after extensive heat treatment, such as UHT processing, due to interactions with $\beta$-lactoglobulin that contains free SH groups that cause irreversible denaturation of plasmin by S—S/S—H interaction of plasmin. Thus, the content of whey protein in the "liquid solution" used in the present invention should be low enough for allowing an effective level of plasmin activity remaining in the solution after thermal processing.

The term "whey protein" pertains to the proteins found in whey. The whey proteins typically include beta-lactoglobulin, alpha-lactalbumin, bovine serum albumin and immunoglobulin, lactoferrin, lactoperoxidase and milk fat globular membrane protein. Additionally, whey protein found in sweet whey typically also comprises caseinomacropeptide.

Preferably, the liquid solution comprises whey protein in an amount of not more than 7% by weight of the total protein content, such as not more than 5% of the total protein content, even more preferable not more than 3% by weight of the total protein content. In a preferred embodiment, the liquid solution comprising casein and plasmin is essentially free of whey protein.

The source of casein used in the present invention is any source of casein that also comprises endogenous plasmin. Preferably, the source of casein and endogenous plasmin is a fraction of a milk product comprising casein protein. Preferably, the fraction of a milk product milk is obtained from fractionating bovine milk.

In an embodiment of the invention, the source of casein and endogenous plasmin is a milk product selected from the group of a micellar casein isolate (MCI), micellar casein concentrate (MCC), micellar casein retentate (MCR), beta-casein depleted micellar casein isolate, beta-casein depleted micellar casein concentrate, milk protein concentrate (MPC), or a microfiltration retentate of a milk product. Preferably, the source of casein and endogenous plasmin is a MCI, MCC, MCR, beta-casein depleted micellar casein isolate, beta-casein depleted micellar casein concentrate, or a microfiltration retentate of a milk product.

In a further preferred embodiment, the source of casein and endogenous plasmin is a selected from the group of a micellar casein concentrate and a micellar casein isolate, since the micellar casein concentrate and isolate will have a high content of micellar casein. The content of micellar casein is higher in the micellar casein isolate than in the micellar casein concentrate, and of this reason, using a micellar casein isolate is preferred. Most preferably, the liquid solution comprising casein and endogeneous plasmin is micellar casein isolate (MCI).

Micellar casein isolate is produced via filtration processes, preferably membrane filtration with a microfiltration membrane that isolate native milk casein proteins from a milk derived feed in a highly concentrated, undenatured form in the microfiltration retentate. Micellar casein isolate (MCI), for example comprises casein in an amount of 85 to 95% by weight of the total protein content. Most often, a MCI comprises 93-94% w/w casein of the total protein content.

MCI may for example by made by subjecting a milk derived feed to microfiltration with a MF membrane(s) typically having a pore size in the range of 0.01-1.0 micron. Preferably, the pore size of the MF membrane(s) is in the range of 0.05-0.8 micron. Further, the MF membrane(s) are provided have a molecular weight cut-off in the range of 200-2000 kDa. The MF membrane(s) may e.g. be polymeric membranes or ceramic membranes.

For example, the MCI can be made by microfiltration with ceramic membranes having a pore size of approx. 0.14 micron (Inside Ceram™, Tami Industries, Nyons, France) or polymeric FR membranes having a molecular weight cutoff of approx. 800 kDa (PVDF 800 kDa; from Synder Filtration, USA).

Microfiltration of a milk derived feed, such as skim milk, to produce micellar casein isolate is well described in the literature and is an existing commercial unit operation well known by those skilled in the art. Microfiltration can be achieved using, but not limited to, spiral wound membranes or ceramic membranes, and can be conducted under a wide range of temperatures, such as cold membrane filtration at a temperature of less than or equal 10° C. or at heated conditions with a temperature of about 50° C., such as 45-55° C.

The beta-casein depleted micellar casein isolate and beta-casein depleted micellar casein concentrate may be obtained by the method described in WO 2014/114 709 A2 as the second retentate from microfiltration obtained by the method in said patent.

The milk derived feed for preparing MCI, MCC, MCR, beta-casein depleted micellar casein isolate and beta-casein depleted micellar casein concentrate may comprise, or even consist of, whole milk, skim milk, fat-free milk, low fat milk, full fat milk and concentrated milk. The milk feed is normally derived from ruminant milk. The term "concentrated milk" pertains to milk that has been concentrated by evaporation or by ultrafiltration, nanofiltration and/or reverse osmosis. It is particularly preferred that the concentrated milk is a concentrated, non-evaporated milk, i.e. a milk that has been concentrated by filtration.

In an embodiment of the invention, the liquid solution comprising casein and endogenous plasmin may be a solution of organic MCI. When organic MCI is used, the milk derived feed used for preparing the MCI is organic.

In the context of the present invention, the term "organic milk" pertains to milk produced by a mammal, e.g. cattle, raised according to the following: The mammal must have free access to certified organic pasture for the entire grazing season. This period is specific to the farm's geographic climate, but must be at least 120 days per year and preferably at least 150 days. Due to weather, season, or climate, the grazing season may or may not be continuous. Organic cattle diets must contain at least 30 percent dry matter (on average) from certified organic pasture. Dry matter intake (DMI) is the amount of feed an animal consumes per day on a moisture-free basis. The rest of its diet must also be certified organic, including hay, grain, and other agricultural products. The livestock should be managed without antibiotics, added growth hormones, mammalian or avian by-products, or other prohibited feed ingredients (e.g. urea or arsenic compounds).

Endogenous Plasmin:

Plasmin is an enzyme that is naturally occurring in milk and by the term "endogenous" is meant that the plasmin used in the method of the present invention is the plasmin naturally occurring a milk product. Hence, the plasmin is naturally occurring in the source of casein used. For example a micellar casein isolate will comprise plasmin.

Plasmin is predominantly active on casein proteins and not whey proteins. Plasmin is in particular active on alpha-caseins and beta-casein, since these casein proteins contain the lysine-arginine motifs recognised by plasmin.

In the context of the present invention, the method does not comprise addition of exogenous enzymes, and in particular, the method does not comprise addition of exogenous plasmin or trypsin. The hydrolysis provided in the present invention is performed only by use of endogenous plasmin, naturally occurring in the liquid solution/feed used as a source of casein for preparing the casein hydrolysate. Trypsin has an effect similar to plasmin, but trypsin is not found endogenously in milk.

Hence, in a preferred embodiment of the invention, the method excludes addition of exogenous enzymes, such as excludes addition of exogenous plasmin or trypsin.

In the context of the present invention, when referred to that the liquid solution comprises endogenous plasmin, it covers that the solution comprises plasmin and related endogenous enzymes such as midi-plasmin, mini-plasmin, micro-plasmin as well as enzymes exhibiting plasmin like activity derived from autolysis of plasmin. Hence, the term "plasmin" will in the context of the present invention cover plasmin-like enzymes, such as midi-plasmin, mini-plasmin, micro-plasmin, and plasminogen that can be converted to plasmin. Hence, the liquid solution used for the present invention may not necessarily comprise plasmin from start, it may instead comprise plasminogen that will convert to plasmin.

In an embodiment of the present invention, the term "plasmin" covers enzymes classified under EC 3.4.21.7.

The plasmin system is very complex, comprising plasmin (PL) and plasmin like enzymes, plasminogen (PG), plasmin activator (PA), plasmin activator inhibitor (PAI) and plasmin inhibitor (PI). PI and PAI are predominantly found in the milk serum while PG, PL and PA are bound to the casein micelle. Thus, isolating casein micelles as MCI, MCC or MCR via microfiltration is expected to remove PI and PAI, facilitating conversion of PG into PL through having PG and PL concentrated together with PA. PI and PAI are also somewhat heat labile and mild thermal processing is expected to inactivate these species, also resulting in an increased conversion of PG to PL. For example, Richardson et al observed an increase in PL and decrease in PG on incubating milk at 37 C for up to 80 h.

The inventors of the present invention have found that commercial pasteurisation conditions (75 C for 15 sec.) will inactivate PAI, and indeed PA is more heat resistant that PG and PL. This means that skim milk used for production of MCI will also contain inactivated PAI and upon separation from whey proteins will result in a system that is primed for conversion of PG into PL.

Liquid Solution:

In the context of the present invention, the term "liquid solution" encompass compositions that contain a combination of liquid and solid compounds or semi-solid particles such as e.g. protein particles. A "solution" may therefore be a suspension or even a slurry. However, the "liquid solution" is preferably pumpable and the amount of liquid in the liquid solution comprising casein and endogenous plasmin is preferably 70-99%, more preferably 80-96%. The liquid used for the liquid solution is typically water.

As earlier mentioned, the liquid solution comprising casein and endogenous plasmin according to the present invention will typically comprise casein in an amount of 1% by weight or more of the liquid solution.

In an embodiment of the invention, the liquid solution comprising casein and endogenous plasmin may be a solution of a) a fraction of a milk derived feed comprising casein and endogenous plasmin, or b) a concentrated fraction of a milk derived feed comprising casein and endogenous plasmin, or c) a fraction of a milk derived feed comprising casein and endogenous plasmin diluted in a liquid, such as water, or d) a concentrated fraction of a milk derived feed diluted in a liquid, such as water.

For example, the liquid solution comprising casein and endogenous plasmin comprises a fraction of a milk derived feed having a high content of casein of the total protein content.

Any type of milk fraction comprising casein and any of endogenous plasmin, plasminogen, midi-plasmin, mini-plasmin, and micro-plasmin may be used.

In the context of the present invention, the term "milk fraction" is understood as being a fraction obtained from a milk-derived feed. The milk fraction may be obtained by membrane filtration processing of a milk-derived feed, but may also be obtained by other fractionating processes.

The milk fraction comprising casein and endogenous plasmin may be selected from the group of a micellar casein isolate (MCI), micellar casein concentrate (MCC), micellar casein retentate (MCR), milk protein concentrate (MPC), beta-casein depleted micellar casein isolate, beta-casein depleted micellar casein concentrate or microfiltration retentate of a milk product. Preferably, the milk fraction is selected from the group of a micellar casein isolate (MCI), micellar casein concentrate (MCC), and micellar casein retentate (MCR). Most preferably, the milk fraction is MCI.

In MCI, MCC and MCR, plasmin inhibitors and plasminogen activator inhibitors are not present. However, in for example milk as such (e.g. skim milk), plasmin inhibitors and plasminogen activator inhibitors are present. Plasmin inhibitors will inhibit the activity of plasmin and is therefore not desired in the liquid solution comprising casein and plasmin. Plasminogen activator inhibitors inhibits the conversion of plasminogen to plasmin and is therefore also not desired. Hence, milk as such is not suitable as the liquid solution comprising casein and plasmin. In an embodiment of the present invention, the liquid solution comprising casein and plasmin does not comprises any plasmin inhibitors or plasminogen activator inhibitors, or at least does not comprise any essential amounts of plasmin inhibitors or and plasminogen activator inhibitors.

Micellar casein isolate (MCI), for example, besides from comprising endogenous plasmin also comprises casein in an amount of 85 to 95% by weight of the total solid content. MCI is produced via filtration processes that isolate native milk casein proteins in a highly concentrated, undenatured form.

A fraction of a milk derived feed comprising casein and plasmin, such as micellar casein or a micellar casein retentate or concentrate, is dispersed in water in an amount to obtain the desired amount of casein.

The milk derived feed may be based on milk from mammals such as cows, buffalos, goats, sheep, yaks, pigs, camels, horses, ewes, mares or mixtures thereof. In a preferred embodiment of the present invention, the liquid solution comprising casein and endogenous plasmin comprises a milk fraction derived from bovine milk.

The milk derived feed that may used to obtain a fraction high in casein content may for example be whole milk, low-fat milk, reduced fat milk, semi-skimmed milk, skim milk, butter milk, reconstituted milk powder, heat treated milk (e.g. pasteurised milk, sterilised milk, condensed milk, evaporated milk and UHT milk), raw unfiltered milk, and homogenised milk.

The liquid solution of the present invention comprises casein in an amount of at least 80% by weight of the total solid content, preferably at least 90% by weight of the total solid content. The content of casein in the liquid solution should also be at least 90% by weight of the total protein content, such as at least 93% by weight of the total protein content. Furthermore, the amount of whey protein in the liquid solution should be at a minimum level. The liquid solution comprises whey protein in an amount of maximum 10% by weight of the total protein content, and preferably maximum 7% by weight of the total protein content.

It was surprising for the inventors of the present invention, that when using a milk fraction derived from milk that had a high casein content and a low whey protein content as compared to milk as such, it was possible to prepare a casein hydrolysate without adding any exogeneous enzymes but using the endogeneous plasmin present in the milk fraction to hydrolyse casein. The inventors of the present invention believes that one reason making it possible to hydrolyse casein by using endogeneous plasmin was because of the whey protein content in the solution used for hydrolysis was low. Without being bound by any theory, the inventors of the present invention believes that a low content of whey protein (reduced amount whey protein) leads to a better protection of plasmin from denaturation during the heat treatment steps. Whey protein, if present, makes interactions with plasmin and therefore decreases plasmins efficiency in hydrolysing casein. Hence, it is desired to have a low amount of whey proteins present in the liquid solution in order to provide an efficient hydrolysis of casein.

In addition, without being bout by any theory, the inventors of the present invention believe that whey proteins are responsible for gelation of a milk product and therefore is responsible for gelation of for example UHT treated milk after a few months of storage. Hence, using a liquid solution comprising casein and plasmin where a significantly amount of whey protein has been removed as compared to milk as such (including skim milk), the casein hydrolysate obtained does not gel over at least 12 months of storage.

In for example bovine milk, the ratio between casein and whey protein is typically 80:20, but it is necessary to decrease the content of whey proteins to be lower than 10% by weight of total protein content in the liquid solution in order to plasmin efficiently hydrolyse casein and the product not gelling.

It was found by the inventors of the present invention that milk products, as such, are not suitable as the liquid solution comprising casein and plasmin because using milk as such will not lead to a casein hydrolysate. Milk as such is not a suitable starting material for preparing casein hydrolysates because the high content of whey protein inhibits the activity of plasmin and cause gelling during storage. Another reason why milk is not suitable for preparing casein hydrolysates is that milk comprises plasmin inhibitors and plasminogen activator inhibitors that also limits the activity of plasmin. In the present invention, where MCI, MCC, MCR, beta-casein depleted MCI and beta-casein depleted MCC typically is used for preparing the casein hydrolysate, plasmin inhibitors and plasminogen activator inhibitors are not present since they have been removed in the serum phase during preparation of MCI, MCC, MCR, beta-casein depleted MCI and beta-casein depleted MCC.

The liquid composition comprising casein and endogenous plasmin is therefore in a preferred embodiment essentially free of plasmin inhibitors and plasminogen activator inhibitors. By the term "essentially free of" is in the content of the present invention meant that the compound is only present in neglible amounts.

The inventors of the present invention also found that in order to efficiently and rapidly obtaining a casein hydrolysate other process parameters should preferably be optimised, i.e. using a pH in the range of 7.2 to 9.0 and using a temperature during the hydrolysis step of 25° C. to 45° C.

The temperature of the liquid solution comprising casein and endogenous plasmin provided in step i) should preferably have a temperature of 1° C. to 45° C., more preferably 1° C. to 20° C. and even more preferably 5° C. to 10° C. before initiating the hydrolysis process. This is in order to control the microbiology, i.e. avoid growth of microorganisms.

The wide range of temperature (1-45° C.) is due to the dependency of time the liquid solution is stored before use. If the storage time before inactivation of microorganisms and enzymatic hydrolysis with endogenous plasmin is low, a higher temperature of the liquid solution before initiating the process is acceptable. However, if the liquid solution comprising casein and endogenous plasmin is stored overnight before initiating the inactivation of microorganisms and hydrolysis, the temperature of storage should be low, and preferably below 10° C. Hence, in a preferred embodiment of the invention, the liquid solution comprising casein and endogenous plasmin has a temperatures of 1° C. to 10° C. before use in the hydrolysis process of the present invention.

PH Adjustment

In step ii) of the present invention, the liquid solution comprising casein and endogenous plasmin is subjected to a pH adjustment to adjust the pH of the liquid solution in step i) to a pH in the range of 7.2 to 9. Preferably, the pH of the liquid solution is adjusted to a pH being in the range of 7.5 to 8.7, such as 7.5 to 8.5 and even more preferably to a pH in the range of 7.5 to 8.2. The pH of milk typically have a pH of 6.7 to 6.8, but the pH optimum of plasmin is about 7.5 to 8.0. The pH should be above 7.2. The activity of plasmin at pH 6.7-6.8 is much lower at pH 6.7-6.8 as compared to a pH above 7.2. The pH during hydrolysis should therefore be above 7.2 because it will take several weeks to hydrolyse casein by the endogeneous plasmin at pH values below 7.2. On the contrary, using a pH of 7.2 to 9.0 during hydrolysis, a casein hydrolysate is obtained in less than 72 hours.

The pH of the liquid solution should have the above mentioned pH of 7.2 to 9, since the activity of endogenous plasmin is optimal at these pH values. At a pH lower than 7.2, the plasmin activity is significantly reduced.

First Heat Treatment:

In an aspect of the present invention, the pH adjusted liquid solution is subjected to a first heat treatment step. The first heat treatment is applied to the liquid solution comprising casein and endogenous plasmin such that the number of microorganisms in the solution is reduced and a longer storage of obtained product is permitted before further processing. Hence, the first heat treatment step is conducted to inactive microorganisms and hence control the microorganisms. The first heat treatment step is necessary to avoid unwanted microorganisms in the hydrolysates, and it was surprisingly found by the inventors of the present invention that endogenous plasmin was not inactivated when a liquid solution of casein and endogenous plasmin was subjected to a heat treatment step where microorganisms was inactivated. In particularly, it was surprisingly found that plasmin was not inactivated even if the heat treatment was extensive. By extensive heat treatment is in the context of the present invention meant heat treatment at a temperature and time period such that all microorganisms are inactivated or all microorganisms are rendered incapable of further growth.

In the context of the present invention, the term "microorganisms" relates to e.g. bacterial spores, yeast, moulds and fungal spores.

The extensiveness of the first heat treatment step will affect the shelf life, as well as the final product qualities. Increasing the extensiveness of the heat treatment, i.e. increasing the temperature of a heat treatment, can reduce the proportion of product spoilage. However, this must also be balanced against the increased chemical, physical, sensory and nutritional changes of the final product.

The first heat treatment step used in the method of the present invention can be at a temperature of from 85° C. to 180° C. The period of the first heat treatment step is dependent of the temperature and can therefore be from 0.1 to 30 seconds. If the temperature is as low as 85-110° C., the time for the heat treatment step should be 15-30 seconds. However, if a higher temperature is used, such a as from 120 to 180° C., the holding time should be 0.1-10 seconds.

In a preferred embodiment of the invention, the first heat treatment step is at a temperature equal to or above 120° C. for 0.1 to 10 seconds. In a further embodiment, the first heat treatment step was at a temperature of 120° C. to 180° C. for 1 to 10 seconds.

The first heat treatment may also in an embodiment be a sequential heat treatment, for example by first raising the temperature to 85° C. to 100° C. for 1-15 seconds and afterwards increase the temperature to above 120° C. for 0.1 to 10 seconds.

It is preferred to use a temperature of 120° C. or above in order to inactivate all microorganisms. The inventors of the present invention have found that if the temperature of the first heat treatment was below 120° C., not all microorganisms was inactivated.

Preferably, the first heat treatment step involves heating to a temperature above 125° C. with a holding time of 0.1 to 10 seconds, more preferably the first heat treatment step is a heat treatment comprising heating to a temperature above 130° C. with a holding time of 0.1 to 10 seconds.

In also an embodiment of the invention, the first heat treatment step comprising heating to a temperature of from 120° C. to 180° C. for 0.1-10 seconds. For example, the first heat treatment step comprising heating to a temperature of 125° C. to 170° C. for 0.1 to 10 seconds, more preferably 125° C. to 160° C. for 0.1 to 10 seconds, even more preferably 130° C. to 150° C. for 0.1 to 10 seconds.

The holding time for the first heat treatment step may be from 0.1 to 10 seconds if a temperature of 120° C. or above is used. However, the inventors of the present invention have found out that the holding time when using a temperature above 120° C. preferably should be with a holding time of 1 second or more in order to completely inactive microorganisms. A heat treatment at a temperature of 120° C. for 1 to 10 seconds are considered an extensive heat treatment. It was surprisingly found that a first heat treatment step with an extensive heat treatment (temperature above 120° C. for 1-10 seconds) did not inactivate plasmin.

In a further embodiment of the invention, the first heat treatment step is having a holding time of 1 to 5 seconds and more preferably 2 to 4 seconds.

In a preferred embodiment of the invention, the first heat treatment step was at a temperature of 120° C. to 180° C. for 1 to 10 seconds, such as 1250 to 170° C. for 1 to 10 seconds, preferably 130° to 150° C. for 1 to 10 seconds.

In particular preferred embodiments of the invention, the first heat treatment step comprising heating to a temperature of 125° C. to 160° C. for 1 to 5 seconds, preferably using a temperature of 130° C. to 145° C. for 3 to 5 seconds.

In an embodiment of the invention the first heat treatment of the pH adjusted liquid solution from step ii) is by use of an ultra-high temperature (UHT) heat treatment, high pressure sterilization or the like.

UHT processing is well-known in the art as a process, where a liquid subjected to UHT treatment is heated to a high temperature and rapidly cooled, such that the holding time is short. The UHT heat treatment may for example be by direct UHT, infusion based UHT or indirect UHT. By the term "UHT" is in the context of the present invention meant heat treatment at ultra high temperature (such as a temperature above 1200) with a short holding time, producing a commercially sterile product which can be stored at room temperature. The process aims to destroy all microorganisms, and any residual microorganisms are unlikely to cause spoilage under normal storage conditions.

In a direct UHT system, i.e. direct steam injection UHT, the pH adjusted liquid solution is heated instantaneously by injecting a high pressure steam having a temperature of from about 120° C. to 180° C. into the liquid and keep in the holding tube for 2 to 5 seconds. The liquid is cooled immediately thereafter to remove the condensed steam. Steam injection allows fast heating and cooling.

The UHT treatment may also be infusion-based, where the liquid solution is pumped through a nozzle into a chamber with high-pressure steam at a relatively low concentration, providing a large surface contact area. Steam infusion is normally using a temperature of 150° C. for 0.1 to 0.3 seconds. This will not be enough to inactivate all microorganisms.

Alternatively, the UHT heat treatment may be by using an indirect heat treatment, such using solid heat exchangers to heat and cool the liquid.

The first heat treatment in step iii) of the present invention may also be by using high pressure sterilization (HPP).

UHT by steam infusion or injection in combination with flash cooling may also be used for the sterilization. Flash cooling provides rapidly removal of heat by vacuum. The UHT with flash cooling will have an ultra short holding time for the heat treatment, i.e. 0.1-0.2 seconds. In an embodiment of the invention, UHT with ultra short holding time is not wished because the sterilization will not remove a sufficient amount of microorganisms.

In a particular embodiment of the invention, the first heat treatment step is by use of direct steam injection UHT at temperatures of 120° C. to 180° C. for 0.1 to 5 seconds.

HPP is a food processing method where food products may be exposed to elevated pressures, in the presence or absence of heat, to inactivate microorganisms. HPP may also be known as high hydrostatic pressure processing (HPP) and ultra-high pressure processing (UHP). HPP may be a thermal or non-thermal process. For example, HPP may be a cold pasteurization technique by which the liquid solution is subjected to pressure between 50 and 1000 MPa transmitted by water. Advantages of high pressure sterilization as compared to heat treatment is that denaturation and alteration of the functionality of proteins is avoided while microorganisms are inactivated. Moreover, high pressure can be used to enhance several processing operations, such as freezing, thawing and extraction, thus providing new processing options.

The first heat treatment in the method of the present invention should inactivate at least 90% of the microorganisms present in the liquid solution comprising casein and endogenous plasmin, but maintain the activity of plasmin. Preferably, at least 95% of the microorganisms should be inactivated, an even more preferably at least 99 of the microorganisms should be inactivated.

In an embodiment of the invention, the pH adjusted and heat treated liquid solution of casein and endogenous plasmin is stored at temperatures of 10° C. or below for at least 10 hours before the hydrolysis step. The cold storage will increase plasmin activity. Further, beta-casein dissociates from the casein micelles at low temperature and associates to the casein micelles at higher temperature. Hence, when the liquid solution of casein and endogenous plasmin is stored at low temperature, more beta-casein is therefore released from the casein micelles into the milk serum.

Preferably, the cold storage before the first heat treatment step is at 8° C. or below, such as 5° C. or below. The cold storage may for example be at 1° to 10° C., such as 2° C. to 8° C. The cold storage is preferably for at least 10 hours, preferably at least 20 hours and more preferably for at least 24 hours. Also, the cold storage is for 10 hours to 72 hours, such as 20 hours to 60 hours, most preferably 1 to 2 days. However, the time limit for the cold storage should not be seen as a limiting factor of the invention and any cold storage for more than 10 hours at a temperature of 1 to 10° C. would result in an increased effect of plasmin.

Hydrolysis/Second Heat Treatment:

In an aspect of the present invention, the casein hydrolysate is obtained by hydrolysis of a pH adjusted liquid solution comprising casein and endogenous plasmin where the liquid solution comprises at least 80% by weight casein of the total solid content and where the liquid solution comprises whey protein in an amount of maximum 10% by weight of the total protein content. The hydrolysis is obtained by a second heat treatment step of the solution in step iii) at a temperature of from 25° C. to 45° C. for at least 6 hours. Hereby endogenous plasmin hydrolyses casein and a casein hydrolysate is obtained.

It is important to have a temperature above 25° C., because at a temperature below 25° C., the activity of endogenous plasmin is significantly decreased such that the rate of hydrolysis is very low. Hence, the temperature during the hydrolysis step should be at least 25° C. Also, it is wished to have the temperature during hydrolysis at a temperature of 45° C. or below in order to obtain activity of the endogenous plasmin. In an embodiment of the invention, the heat treatment in step iv) is at a temperature of from 30° C. to 42° C., such as 35° C. to 40° C.

The time of hydrolysis should not be seen as a limitation and in principle, the hydrolysis could be carried out for any time period sufficient for endogenous plasmin to hydrolyse casein and hence obtain a casein hydrolysate. The degree of hydrolysis is dependent on the time period of hydrolysis and hence, a shorter hydrolysis time would give a lower degree of hydrolysis, while a higher hydrolysis time would give a higher degree of hydrolysis. The time period of hydrolysis is preferably at least 6 hours, such as at least 8 hours and more preferably at least 10 hours. In principle, the upper limit of the hydrolysis time is not important, since plasmin after some time will autolyse (hydrolyse itself). However, an example of time period for the hydrolysis is 6 hours to 10 days, such as 6 hours to 5 days and more preferably 6 hours to 72 hours. A hydrolysis time of at least 6 hours is to provide enough hydrolysis to obtain a substantial amount of hydrolysed casein, while 24 h and 48 h will also provide an acceptable level of hydrolysis for the proposed application. It is known that plasmin will autolyse and without being bound by theory, it is expected that longer incubations times might not be desirable for this reason, as well as capacity limitations and costs incurred with storing that long processing times imparts on a processing line.

Most preferably, the hydrolysis is carried out at a temperature of 30° C. to 45° C. for 6 hours to 10 days, more preferably from 30° C. to 42° C. for 6 hours to 10 days and even more preferably from 35° C. to 42° C. for 6 hours to 5 days.

The hydrolysis may in a preferred embodiment also be carried out at 35° C. to 42° C. for 6 hours to 72 hours.

The hydrolysis results in endogenous plasmin cleaving the beta- and alpha S1-caseins into peptides leading to an accumulation of peptides from these two proteins. It was observed that kappa casein was left essentially intact during the hydrolysis with endogenous plasmin.

The present invention of preparing a casein hydrolysate according to the first aspect of the invention is an optimised process with the focus of optimising hydrolysis of casein. In the most preferred embodiment of the invention using hydrolysis of an 8% w/w solution of MCI, pH 7.5-8.0, temperature of 38° C. and 24 hours storage of MCI at 5° C. before hydrolysis resulted in a casein hydrolysate after 48 hours of hydrolysis where about 85% beta-casein was hydrolysed, i.e. only 15% intact beta-casein was remained (based on HPLC peak area). Further, said optimised method results in 57% hydrolysis of α-S1 casein after 48 hours hydrolysis. On the contrary, storage of UHT treated milk, for example, will take months to hydrolyse and will gel during storage. Gelation of the casein hydrolysate of the present invention is not desired. When the casein hydrolysate of the present invention is stored for 6 months, the product changes in appearance from milky to semi-transparent. However, the product does not gel or precipitate during storage. This is different from for example storage of UHT treated milk where gelation occurs over a few months of storage.

In an embodiment of the invention, the activity of endogenous plasmin is inactivated or activity significantly decreased when a casein hydrolysate with desired degree of hydrolysis is obtained. When inactivating or decreasing activity of plasmin, the hydrolysis is stopped or at least slowed down. Endogenous plasmin can be inactivated or decreased by different methods and the present invention should not be limited to any way of inactivating endogenous plasmin and hence stop the hydrolysis. The step of plasmin inactivation/decrease of activity should preferably control the activity of the both the plasmin, plasmin-like enzyme and the pro-enzyme plasminogen.

The inactivation/decreasing activity step of plasmin should preferably control the combined activity of plasmin, plasmin-like enzyme and plasminogen of the treated liquid by at least 80% to the activity of the untreated liquid, preferably at least 90%.

However, as examples, the endogenous plasmin may be controlled by one or more of the following process steps:

i) adjust pH to below 6.0
ii) decrease the temperatures to 10° C. or below
iii) drying the obtained casein hydrolysate
iv) adding denatured whey protein
v) adding plasmin inhibitors and/or plasmin activity inhibitors
vi) adding cysteine
vii) increase the temperature 65° C. or above Plasmin has decreased activity at pH values of 6.8 or below. If the pH is adjusted to below 6.8, the hydrolysis could be slowed significantly down.

Furthermore, the activity of plasmin may be controlled at temperatures below 20° C. and at temperatures above 55° C. Hence, if the temperature of the liquid solution is adjusted to for example 10° C. or below or 65° C. or above, the activity of plasmin is significantly decreased and the hydrolysis process insignificant.

Control of plasmin activity could also be by done by subjecting the obtained casein hydrolysate to a drying step. A drying step will inactivate plasmin and prevent any further hydrolysis. The drying could for example be by spray-drying or freeze drying, but the present invention should not be limited to any drying step.

Further, control of the activity of endogenous plasmin could be by adding denatured whey protein to the casein hydrolysate. Whey protein will bind to the plasmin close to the active site of plasmin and thereby limit the activity of plasmin. Further, control of the activity of endogenous plasmin could be by adding plasmin inhibitors (PI) and/or plasmin activity inhibitors (PAI).

Inactivation of endogenous plasmin could also be by adding cysteine. The cysteine, as for whey proteins, binds to plasmin close to the active site. The free thiol in cysteine binds to plasmin via thiol disulphide interchange such that plasmin becomes inactive.

The hydrolysis of casein can for example be carried out by placing the pH adjusted and microbial inactivated liquid solution of step iii) in sterilized bottles. The filled bottles can then be subjected to heat treatment at a temperature of 25° C. to 45° C. for a period of time sufficient to hydrolyse the casein and hence obtain a casein hydrolysate, for example 6 hours to 10 days.

However, the hydrolysis step could also be by transferring pH adjusted and microbial inactivated liquid solution into sterile holding tanks downstream the first heat treatment unit for inactivating microorganisms. Holding scale would preferably be used in larger scale production, while hydrolysis in bottles are used in small-scale production.

The form of the casein hydrolysate obtained by the method according to the invention should not be seen as a limitation and the casein hydrolysate can be in any form, for example in liquid form, or as a concentrate, powder or granule. However, in an embodiment the casein hydrolysate obtained in step iv) of the invention is dried to a powder. The drying process may for example be spray drying or freeze drying.

Homogenisation:

In an embodiment of the invention, the pH adjusted liquid solution comprising casein and endogenous plasmin (of step ii) is subjected to a homogenization step before subjected to the first heat treatment step for inactivation of microorganisms.

Homogenization is a mechanical treatment which results in a reduction of the size, and an increase in the number and total surface area, of fat globules in the milk. This reduces milk's tendency to form cream at the surface, and on contact with containers enhances its stability and makes it more palatable for consumers. Further, homogenisation secures an even distribution of casein micelles in the solution before the first heat treatment step.

Casein Hydrolysate:

An aspect of the invention relates to a natural casein hydrolysate obtainable by the method according to invention.

The natural casein hydrolysate made by the method according to the present invention has the advantage of being prepared without the use of any added exogenous enzymes and is therefore completely natural. This is an advantage since regulatory issues can be avoided. Further, the accumulation of peptides in the casein hydrolysate obtained by use of endogenous plasmin as compared to use added exogenous plasmin is more similar to that of human milk. The amino acid sequence of the peptides present in the casein hydrolysate of the present invention is not similar to the amino acid sequence in the peptides in human milk, but the accumulation of peptides are similar. The peptides of the casein hydrolysate has up to 50% amino acid sequence similarity to the peptides of human milk which is higher that casein hydrolysates obtained by hydrolysis with added enzymes. This allows a source of casein peptides that can be formulated into an infant formula product that reflects human milk more than when casein peptides are obtained by use of exogenous peptides. Further, in the case of beta casein, some of the major peptides generated by plasmin, the gamma caseins, are considered non-allergic which is a particular benefit for those infants who exhibit issues as regards milk protein tolerance.

Hence, in an embodiment the natural casein hydrolysate of the present invention does not comprises added exogenous enzymes.

The casein hydrolysate of the present invention comprises at least 80% by weight casein of the total solid content. Further, the casein hydrolysate of the invention comprises whey protein in an amount of maximum 10% by weight of the total protein content. Further details of the casein hydrolysate as disclosed during the section of the present application relating to the method of preparing the casein hydrolysate, also applies to the casein hydrolysate.

The casein hydrolysate of the invention is a natural product.

In the context of the present invention, the term "natural" is to be understood as a product that does not comprise any ingredients not naturally occurring in milk or a milk fraction or a milk fraction diluted in water. For example, addition of exogenous enzymes such as plasmin would not fall under the term "naturally".

The casein hydrolysate of the present invention comprises peptides where at least 50% of the peptides have a molecular weight of 1000 to 3000 Da and less than 1% of the peptides have a molecular weight of 5000 Da or above. Further, 10% or less of the peptides have a molecular weight of below 1000 Da The peptides present in the casein hydrolysate of the invention will exhibit functional effects such as immune stimulation not found in commercially available hydrolysates.

Nutritional Composition Comprising the Casein Hydrolysate of the Invention:

In a further aspect, the invention relates to the use of the casein hydrolysate according to the invention in a nutritional composition. The nutritional composition may e.g. be a paediatric nutritional product, such as e.g. an infant formula (both term and pre-term infants), a follow-on formula or a growing up-formula. The nutritional composition may be nutritionally complete for the intended consumer, e.g. an infant between 0-6 months or an infant between 6-12 moths, or it may be a nutritional supplement. The nutritional composition may be in the form of a liquid product, a concentrated liquid product, a paste or a powder.

It should be noted that embodiments and features described in the context of one of the aspects of the present invention also apply to the other aspects of the invention.

The invention will now be described in further details in the following non-limiting examples.

EXAMPLES

Example 1—Test Methods

Example 1.1 HPLC-C18 for Analysing Caseins in a Sample

Equipment and Materials:

Chromatographic System:

Waters Acquity UPLC system with UV-detector.

Column:

First column: Agilent Poroshell 120 SB-C18, 2.1×5 mm, 2.7 Micron (P.N. 821725-912)

Second column: Agilent Poroshell 120 SB-C18, 2.1×150 mm, 2.7 Micron (P.N. 683775-902)

The sample is first run through a first column to remove impurities and then run through a second column for the separation of the peptides.

Solutions and Preparations:

ACN 25%: Mix 250 ml ACN with 750 ml MQ

Reduction Buffer:

6M Urea 0.1M Sodium Citrate 0.02M DTT

Eluent A (0.1% Trifluoroacetic acid (TFA) in MQ water):

1 ml of TFA is added to 990 ml MQ water (below surface as it is very volatile) in a 1000 ml volu-metric flask, fill up with water Mix and transfer to a blue cap bottle Degas for 20 min.

Eluent B (0.1% Trifluoroacetic acid (TFA) in ACN):

1 ml of TFA is added to 990 ml ACN (below surface as it is very volatile) in a 1000 ml volumetric flask, fill up with CAN Mix and transfer to a blue cap bottle Degas for 20 min.

Eluent A and Eluent B was used in the chromatography with the following settings as mentioned in table 1:

TABLE 1

| Time [min] | A [%] | B [%] |
|---|---|---|
| 0.0 | 68.2 | 31.8 |
| 1.5 | 68.2 | 31.8 |
| 15.5 | 56.5 | 43.5 |
| 19 | 40 | 60 |
| 19.5 | 0 | 100 |
| 21.5 | 0 | 100 |
| 22 | 100 | 0 |
| 24 | 100 | 0 |
| 24.5 | 0 | 100 |
| 26.5 | 0 | 100 |
| 27 | 100 | 0 |
| 29 | 100 | 0 |
| 29.5 | 0 | 100 |
| 31.5 | 0 | 100 |
| 32 | 100 | 0 |
| 34 | 100 | 0 |
| 34.5 | 0 | 100 |
| 36.5 | 0 | 100 |
| 37 | 100 | 0 |
| 39 | 100 | 0 |
| 39.5 | 0 | 100 |
| 41.5 | 0 | 100 |
| 42 | 68.2 | 31.8 |
| 47 | 68.2 | 31.8 |

The flow was 0.35 ml/min (expected pressure at start conditions: 4100 psi) and the temperature of the column was 42° C. The auto sampler temperature was 12° C. The injection volume was 5 µl for all samples. UV detection was 214 nm. After injection of each sample, the HPLC system was washed for 22 minutes (time 19.5 to 41.5).

Example 1.2 Assay for Detecting Plasmin Activity

Materials:

0.4 M tri-sodium citrate buffer, pH 8.9 with NaOH

Assay Buffer 1:

0.1 M tris-HCl 8 mM EACA (ε-aminocaproic acid)

0.4 M NaCl pH 8 with NaOH

Substrate S-2251:

4 mM in assay buffer 1

Commercial Plasmin Standard:

Stock solution of bovine plasmin from Roche, reference No. 0.5 U in assay buffer containing 4 mg/ml gelatine to stabilize.

Linear in the range 15 µU/ml to 1 mU/ml.

Procedure:

1 ml sample solution were mixed with 250 µL 0.4 M tri-sodium citrate buffer, pH 8.9 and shaken for 15 minutes to dissociate the casein micelles.

The citrate-treated sample were diluted 1:1 with assay buffer 1 and shaken for 15 minutes to dissociate plasmin and plasminogen from the caseins.

Absorbance was read at 405 nm and 490 nm at 37° C. using a plate reader at interval of 5 minutes for 120 minutes.

To correct for turbidity, the background absorbance values at 490 nm were subtracted from the absorbance values at 405 nm.

The increase in absorbance, indicated as $\Delta A_{405\ nm-490\ nm}$ as a function of time, was converted into plasmin units using a standard curve

Example 1.3: Method to Determine the Peptide Distribution in the Whey Protein Hydrolysates Size exclusion chromatography (SEC) was used to analyze the molecular weight distribution of the peptides in a casein hydrolysate. SEC is used to separate polymer type molecules by size. A mixture of components of different size, here peptides, can be separated by SEC. The elution time is dependent on the size of the molecule. The smaller the molecule the longer the elution time.

The samples were dissolved in the mobile phase to a concentration of 0.5% w/v. Before injection the sample was filtered through a 0.45 µm filter. Chromatographic separation was performed on three TSK G2000 SWXL (125 Å, 5 µm, 7.5 mm×300 mm) columns bound in series. A buffer of 0.0375 M phosphate buffer, 0.375 M ammonium chloride, 0.1% Trifluoroacetic acid (TFA), and 25% acetonitrile ($CH_3CN$) was used as the mobile phase with a flow of 0.7 mL per minute. Detection of the peptides were performed using a UV-detector measuring at 214 nm.

Based on the retention time, the distribution of peptides is divided according to size, and the relative amount is given according to the molecular weight.

Example 2—Plasmin Activity in a Retentate of Microfiltrated Skim Milk (MCI)

Micellar casein isolate was prepared by microfiltration of low pasteurised skim milk to produce micellar casein isolate.

A micellar casein isolate was prepared as a retentate of microfiltrated skim milk by providing 1200 kg pasteurized (73° C./15 seconds), organic concentrated skim milk preheated to 52° C. The pH of the skim milk is 6.7. The skim milk was containing 6.4% (w/w) protein, 4.7% (w/w) lactose and 0.1% (w/w) fat and 12.5% (w/w) total solids.

The preheated skim milk is subjected to microfiltration (MF), in batch mode, on a polymeric FR membrane from Synder Filtration (USA), which has a pore size of 800 kDA, at 50° C. and with the transmembrane pressure (TMP) of 0.45 bar. After collection of 720 liter permeate, diafiltration starts by adding reverse osmosis (RO) filtered tap water to the retentate at the same flow rate as the flow rate of the MF permeate. After adding 3.000 liter RO filtered tap water, the filtration is finish. 480 kg MF retentate and 3.720 kg MF permeate is collected. 98% of the lactose and 79% of the whey proteins from the skim milk is collected in the MF permeate and 97% of micellar casein from the skim milk is collected in the MF retentate.

The survival of plasmin in the thermally processed MF retentate (MCI) was analysed according to the method mentioned in example 1.2. Samples were made with 8% w/w MCI solution adjusted to a pH 7.5 with 10% KOH. The samples was thermally processed at a temperatures of 130° C., 135° C. and 140° C. for 3-4 seconds and the plasmin activity analysed. The plasmin activity is shown in table 2 below.

TABLE 2

Plasmin activity in MCI samples compared to skim milk reference.

| Temperature | PL activity (μU/ml) |
|---|---|
| 140 C. ° | 700 |
| 135° C. | 615 |
| 130° C. | 1085 |
| Skim milk | 914 |

Example 3: Effect of Incubation Temperature on Extent of Plasmin Derived Hydrolysis Of MCI after Thermal Treatment Samples were made with 8% w/w MCI solution adjusted to a pH 7.5 with 10% KOH. The samples was thermally processed at a temperatures of 130° C., 135° C. and 140° C. for 3-4 seconds, and placed in different bottles via aseptic filling. The bottles were incubated at 20° C. and 38° C. respectively for 24 hours. Four batches of MCI at each temperature (130° C., 135° C. and 140° C.) were made, i.e. 4 bottles was thermally processed at 130° C., 135° C. and 140° C., respectively. Two of the four bottles were then incubated at 38° C. while the two other bottles was incubated at 20° C.

The samples was removed from the incubator after 0, 3, 6, 24 hours and immediately frozen until HPLC analysis was conducted (according to example 1.1). Samples were prepared by diluting 8 times by volume in reduction buffer and left for 1 hour at room temperature. The diluted sample were filtered via 0.22 μm cellulose acetate filters (VWR #514-0060) before entering the HPLC.

Plasmin activity in the samples, prior to incubation, was measured using the method described in example 1.2. The results are shown in FIGS. 1 and 2.

FIG. 1 shows plasmin derived peptides eluting from 12.00-14.00 minutes on RP-HPLC.

Figure 2:
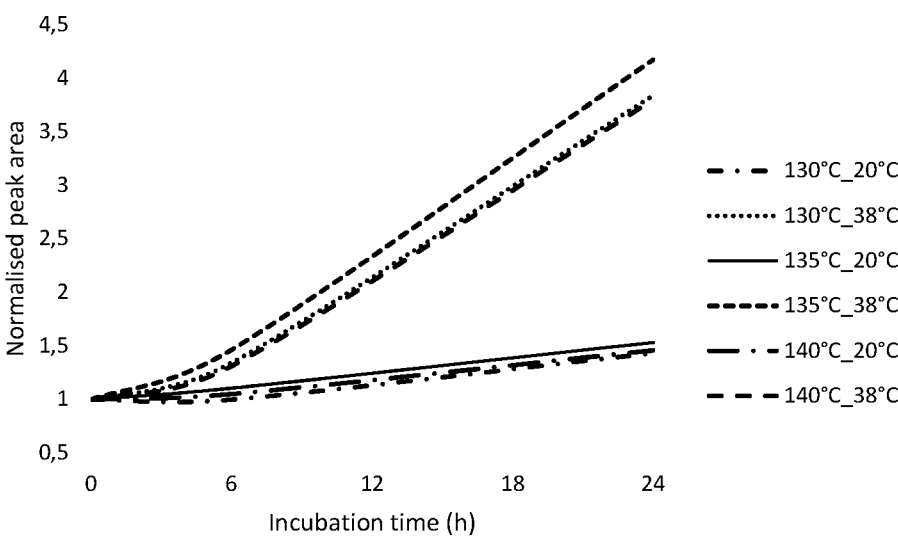
FIG. 2 shows the influence of the temperature of the first heat treatment step on the evolution of plasmin derived peptides in 8% w/v MCI solution.

FIG. 2 shows plasmin derived peptides eluting from 17.00-18.00 minutes on RP-HPLC.

From FIGS. 1 and 2, it is shown that incubation at a temperature of 38° C. provides as compared to incubation at 20° C. provides an increased loss of intact α-S1-casein and β-casein and an increased accumulation of peptides, both the peptides observed at 13 min and 17 minutes at the HPLC-RP.

The loss of intact α-S1-casein and β-casein is about 20-25% more when using 38° C. than 20° C. and an increase in peptides is about a fourfold. Hence, the hydrolysis is more efficient at 38° C. than 20° C. which is believed to be because of improved plasmin activity of 38 than 20° C.

Also, FIGS. 1 and 2 show that it is possible to maintain plasmin activity after sterilization to temperatures of 130° C., 135° C. and 140° C. for 3-4 s.

Example 4: Effect of Cold Storage Prior to Thermal Processing of MCI on Plasmin Activity and Hydrolysis of Casein This example shows the effect of cold storage on plasmin activity and the extent of hydrolysis.

Samples were made with 8% (w/w) MCI solution adjusted to a pH 7.5 with 10% NaOH.

The thermal processing (first heating step) of MCI was carried out at two different days, with time differences of 24 h and under the condition of storage at 4-5° C. Hereby, the effect on plasmin activity and hydrolysis is shown after storage for 24 hours at 5° C. The samples from the two different days will below be referred to as from day1 and day2. On each day, the MCI were subjected to thermal processing at a temperature of 130° C., 135° C. and 140° C. for 3-4 seconds, and aseptic filled in 100 ml bottles.

Right after thermal treatment, the bottled samples were incubated at 37-40° C. for 24 hours, samples were taken at the time period of 0, 3, 6 and 24 hours incubation and immediately frozen until analysis by HPLC-RP (samples for the HPLC was prepared as in example 3). The plasmin activity was measured 5 days after thermal treatment by the method of example 1.2, while the samples are stored at 4° C. before analysis.

The loss of intact α-S1-casein β-casein was calculated by comparing the peak areas of these proteins given by the respective RP-HPLC chromatograms. The peak areas were normalised to the peak area of a given protein at t=0, that is to say, immediately prior to incubation.

Figure 3:
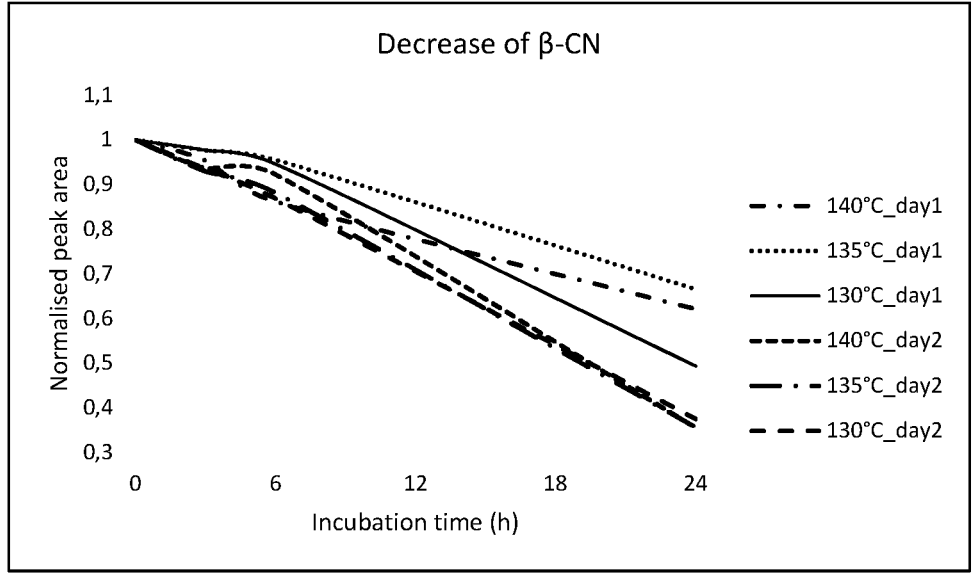
FIG. 3 shows the loss of intact beta-casein determined by RP-HPLC. The y-axis is normalised to peak area of beta-casein at t=0 immediately prior to incubation.

The loss of intact β-casein of the different samples is shown in FIG. 3.

Figure 4:
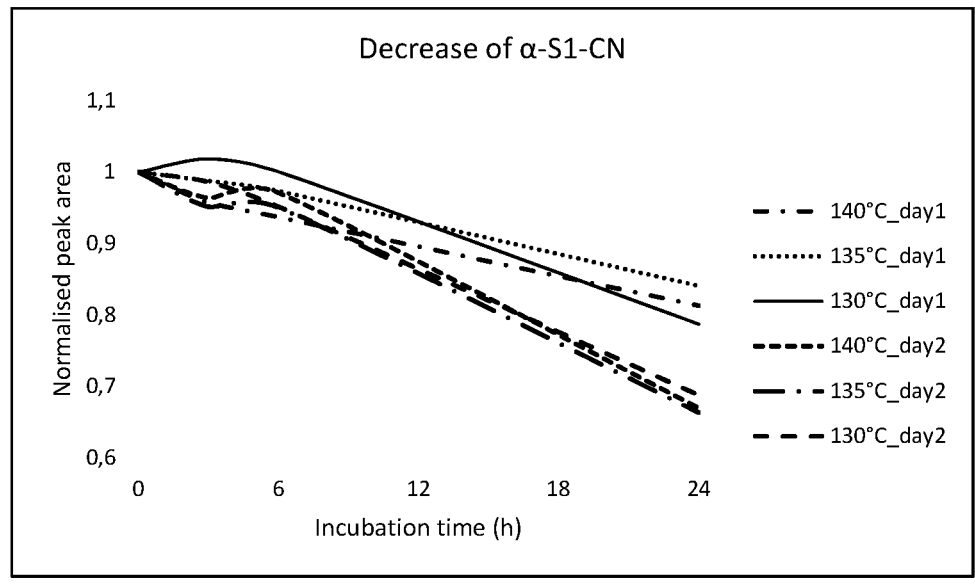
FIG. 4 shows the loss of intact alpha-S1 casein determined by RP-HPLC. The y-axis is normalised to peak area of alpha-S1 casein at t=0 immediately prior to incubation.

The loss of intact α-S1-casein of the different samples is shown in FIG. 4.

The accumulation of peptides in the different samples was quantified in an identical manner, normalising to the initial level of plasmin derived peptides, naturally present in the milk, and that are retained in the MCI after microfiltration.

Figure 5:
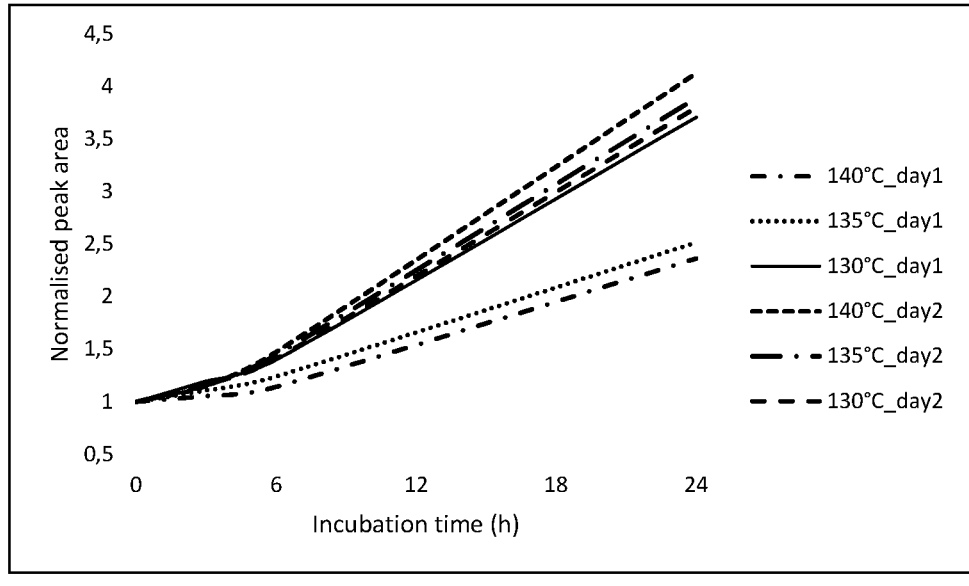
FIG. 5 shows accumulation of peptides from thermal processing at temperatures 130° C., 135° C. and 140° C. for 3-4 seconds. The plasmin derived peptides are eluting at 12.00-14.00 minutes on RP-HPLC. The thermal processing was either on the same day as processing (day 1) or after 24 hours storage at 5° C. (day 2). Y-axis is normalised peak area, i.e. the peak area at t=0 and subsequent data points on y axis are relative to this.
Figure 6:
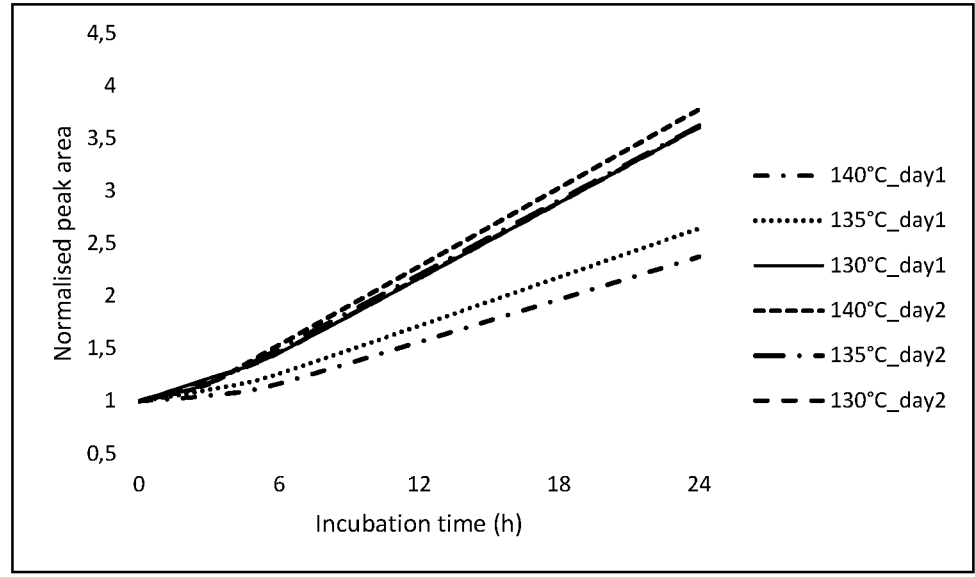
FIG. 6 shows accumulation of peptides from thermal processing at temperatures of 130° C., 135° C. and 140° C. for 3-4 seconds. The plasmin derived peptides are eluting at 17.00-18.00 minutes on RP-HPLC. The thermal processing was either on the same day as processing (day 1) or after 24 hours storage at 5° C. (day 2).

Thus, the accumulation of peptides in the regions of 12-14 min. and 17-18 min. on HPLC chromatograph is shown in FIGS. 5 and 6, respectively.

It is apparent from the respective figures that plasmin activity in the MCI and consequently extent of hydrolysis of intact casein proteins is influenced by 24 h of storage at 4-5° C. prior to thermal treatment and that plasmin is retained in all samples regardless of whether they were thermally processed at 130, 135 or 140° C. for 3-4 s.

It is clear that a significant accumulation of casein peptides occurs over 24 h incubation. In particular, for samples stored at 5° C. for 24 h prior to thermal treatment, a factor of between 1.8 and 4 compared to t=0, and a concomitant loss of intact β-casein of about 64% regardless of thermal processing, and a loss of α-S1-casein of between 34% and 54% with thermal treatment at 130° C. for 3-4 seconds, resulted in a greater loss of intact α-S1-casein. For samples that were thermal treated at day1, a loss of between 34% and 54% of intact β-casein was noted, while a loss of between 15 and 25% of intact α-S1-casein was seen.

Figure 7:
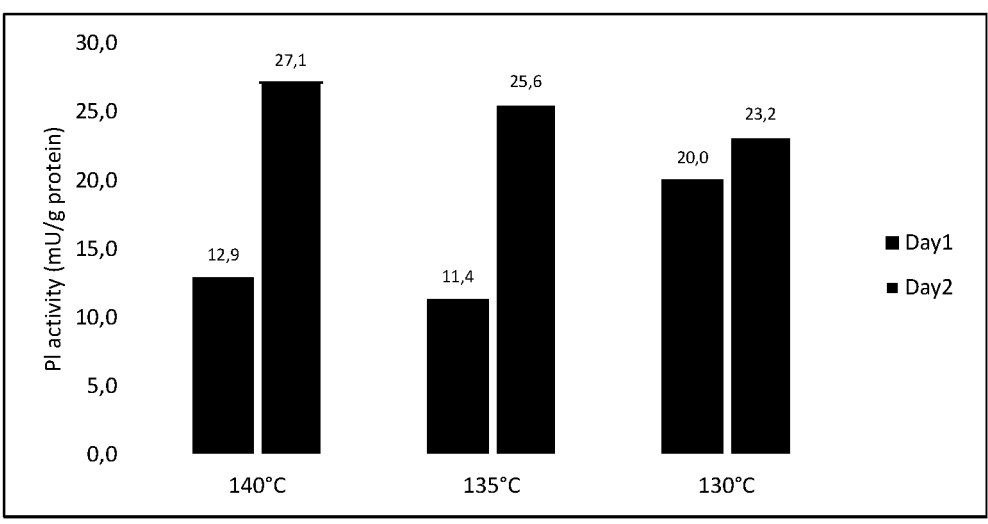
FIG. 7 shows the change of plasmin activity between day 1 and day 2, i.e. after 24 hours storage at 5° C., in a thermally processed MCI.

The plasmin activity was measured according to example 2.1 of the thermally processed MCI from day1 and day2, see FIG. 7. The difference of the extent of hydrolysis of caseins between day1 and day2 samples, as shown in FIG. 7, can be explained by the increase of plasmin activity after 24 h cold storage before thermal treatment at all conditions. During this 24 h, the plasminogen converts into plasmin hence increase the plasmin activity.

Figure 8:
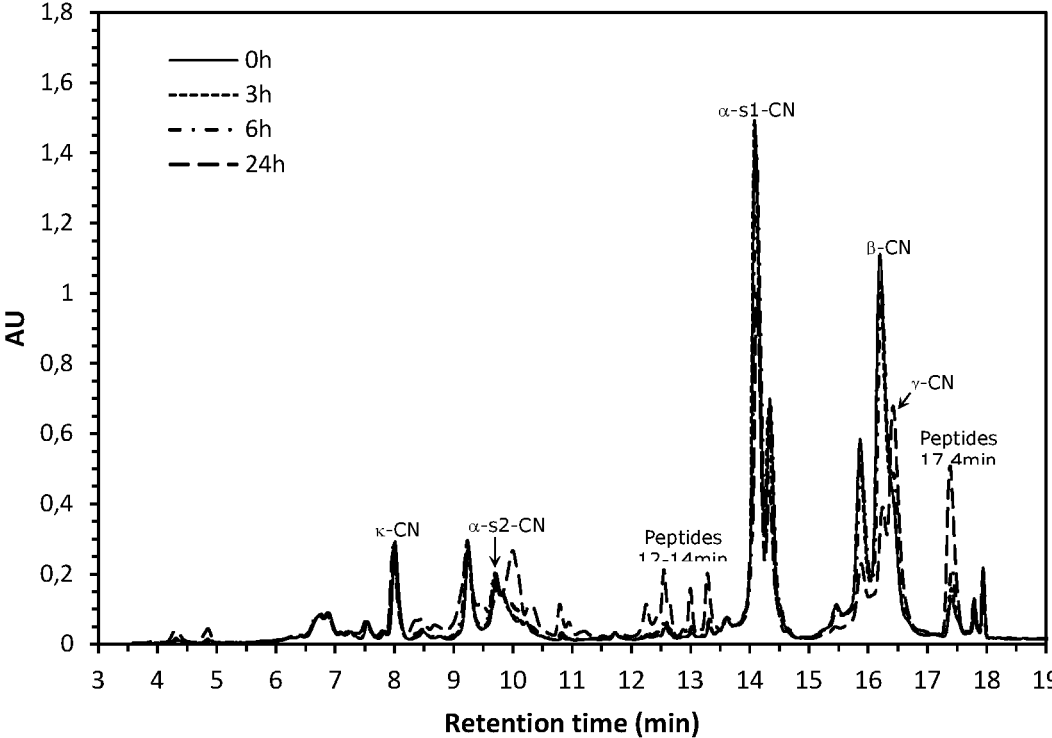
FIG. 8 shows a representative RP-HPLC chromatogram (overlayed) of plasmin induced hydrolysis of caseins.

In summary, it is evident that embodiments of this invention allows for a substantial hydrolysis of intact α-S1-casein and β-casein and accumulation of casein peptides as a consequence of the action of endogenous plasmin. This is evidenced by the loss peak area of these two proteins by RP-HPLC (>50%) over the 24 h incubation. It is also evident from the overlayed (FIG. 8) representative HPLC trace, that kappa casein (retention time 8 and 9.25 min.) remains intact after the 24 h incubation period which is in good agreement with the literature describing the selectivity of plasmin for alpha and beta caseins.

Example 5: Microbiology

An example was made to show that the microorganisms was inactivated after the thermal processing (first heat treatment step) process.

Samples were made with 8% w/w MCI solution adjusted to a pH 7.5 with 10% KOH. The samples was subjected to a first heat treatment step by using UHT heat treatment to a temperature of 130° C., 135° C. and 140° C. for 3-4 seconds, and placed in different bottles aseptically. The bottles were stored at 37° C. for 10 days before sending to microbiological analysis. Every temperature was analysed by bottles. The results are shown below in table 3.

The following terms in table 3 refers to the following:

B.C.SP: *Bacillus cereus* spores
CLO.SP: Clostridia spores
THF: Thermophilic bacteria
TPC: Total plate count
CLO.SP-1: sample diluted 10 times
CLO.SP: sample is not diluted
THF-1: sample is diluted 10 times
TPC-1: Sample is diluted 10 times One bottle of the MCI sample (100 ml) hydrolysed according to the present invention was taken from −80° C. and thawed at room temperature. For the ultra-centrifugation method, around 25 ml are taken out for adjusting pH to 4.6, and centrifuged at 11000×g for 10 min at 4° C. Then 10 ml supernatant is taken into 50 ml tube, and frozen at −20° C. (1×centrifugation), and another 10 ml supernatant is centrifuged at 13200×g at 5° C. for 10 min. (2× centrifugation). The supernatant from second centrifugation mainly containing the casein peptides was transferred into new tube. A total of 1 mL of the supernatant from second centrifugation sample was reduced with 30 μL 100 mM dithiothreitol (DTT) for 1 h at 25° C., and alkylated with 70 μL of 100 mM iodoacetamide (IAA) for 50 min at 25° C. in the dark.

For the 10 KDa MWCO column method, based on the pre-determined protein concentration, 1 mL of the MCI sample hydrolysed according to the present invention was diluted with 6 M urea buffer to the final concentration of 10 mg·mL$^{-1}$, mixed well and sonicated for 30 minutes to dissolve the protein in the buffer. Then 100 μL of sample solution (1 mg of protein) were reduced with 30 μL 100 mM dithiothreitol (DTT) for 1 h at 25° C. and alkylated in 70 μL

TABLE 3

| | Bottle 1 B.C.SP | Bottle 2 CLO.SP-1 | Bottle 3 CLO.SP | Bottle 4 THF | Bottle 5 THF-1 | Bottle 6 TPC | Bottle 7 TPC-1 |
|---|---|---|---|---|---|---|---|
| MCI 130° C. STERILE TEST | <1 | <10 | <10 | <10 | <10 | <10 | <10 |
| MCI 130° C. STERILE TEST | <1 | <10 | <10 | <10 | <10 | <10 | <10 |
| MCI 130° C. STERILE TEST | <1 | <10 | <10 | <10 | <10 | <10 | <10 |
| MCI 135° C. STERILE TEST | <1 | <10 | <10 | <10 | <10 | <10 | <10 |
| MCI 135° C. STERILE TEST | <1 | <10 | <10 | <10 | <10 | 10 | 10 |
| MCI 135° C. STERILE TEST | <1 | <10 | <10 | <10 | <10 | <10 | <10 |
| MCI 140° C. STERILE TEST | <1 | <10 | <10 | <10 | <10 | <10 | <10 |
| MCI 140° C. STERILE TEST | <1 | <10 | <10 | <10 | <10 | <10 | <10 |
| MCI 140° C. STERILE TEST | <1 | <10 | <10 | <10 | <10 | <10 | <10 |

As shown in table 3, all samples of 10 days storage at 37° C. resulted in a microbial content of less than 10 cfu/mL. This confirms that the first heat treatment at temperatures 130° C. to 140° C. was sterile. Since the hydrolysis in this example proceeds for 24 hours only, the result is a strong indication that a safe hydrolysis can be performed after UHT treatment in a suitable sterile holding tank.

Example 6 LCMS/MS and Proteomic Characterisation of Casein Hydrolysate

High resolution LCMS/MS was conducted of samples of MCI hydrolysed according to the method of the present invention to confirm that it was the action of plasmin on the alpha and beta caseins that lead to the accumulation of the majority of the peptides found in the hydrolysate. Further, peptides were matched to known bioactive peptides using an open access database.

In order to have a broad coverage and identify as many of the plasmin derived peptides as possible, two methods (ultra-centrifugation method and the 10 KDa MWCO column method) were used to extract the peptides from the hydrolysed MCI sample. The two methods can briefly be described as:

of 100 mM iodoacetamide for 50 minutes at 25° C. in the dark, 800 of 50 mM TEAB buffer were added to the sample to a final volume 1 mL (1 mg/mL). The prepared sample solution was filtered with 10 KDa MW cut-off column filter (Merk Millipore, Germany) by centrifugation at 14000 g for 20 minutes, and further washed with 0.5 mL 50 mM TEAB buffer by centrifugation at 14000 RPM for 20 minutes, the filtered peptides were collected in the filtered tube and used for further analysis of endogenous peptides.

The peptide samples were desalted and purified with a hydrophilic-lipophilic balance solid-phase extraction (OA-SIS HLB-SPE) (Waters, Bedford, MA) cartridge column. Briefly, the columns were washed with 1 mL 100% acetonitrile (ACN) twice, 1 mL 0.1% trifluoro acetic acid (TFA) twice, then the peptide samples were loaded to the columns, washed twice with 1 mL 0.1% TFA, then the peptides were eluted with 1 mL of Elution buffer containing 0.1% TFA, 29.9% MQ water and 70% ACN. The eluted peptides were lyophilized by vacuum centrifugation, and subsequently resuspended in 1000 μL of 0.1% formic acid (FA) buffer for further LCMS analysis.

The peptide samples were analysed by LC-MS for protein and peptide identification. Each sample was analysed with 3 technical replicates, and 5 ul peptide sample was injected for each analysis. The peptides were automatically injected and loaded on a Waters ACQUITY UPLC CSH C18 Column (130 Å, 1.7 μm, 2.1 mm×150 mm) by reversed phase chromatography which was run on the Dionex 3000 UPLC system (Thermo Fisher Scientific). Mobile phase was buffer B (99.9% ACN/0.1% formic acid) and buffer A (0.1% formic acid). Samples were loaded using intelligent flow control at a maximum pressure of 800 bar. The LC gradients were run at 300 uL/min with a profile of: 0-30% buffer B over 18 min, 30-50% buffer B in 5 min, 50-100% buffer B in 2 min and 3 min at 100% B before returning to buffer A for re-equilibration. The UPLC was online connected to a Q Exactive Plus Hybrid Quadrupole-Orbitrap mass spectrometer (Thermo Fisher Scientific) operating in positive ion mode and using data-dependent acquisition. The Orbitrap acquired the full MS scan with an automatic gain control (AGC) target value of 1e6 ions and a maximum fill time of 100 millisecond. Each MS scan was acquired with high-resolution 70,000 full-width half maximum (FWHM) at m/z 200 in the Orbitrap with a range of 400-3000. The top 20 most abundant peptide ions were selected from the MS for higher energy collision-induced dissociation (HCD) MS2 fragmentation (normalized collision energy: 28V) in the Orbitrap. Fragmentation was performed at high resolution (17500 FWHM) for a target of 2e4 and a maximum injection time of 150 milliseconds using an isolation window of 1.5 m/z and dynamic exclusion duration of 15 seconds with a 10 ppm tolerance around the selected precursor. Only those precursors with charge state +2, +3, +4 and +5 were sampled for MS2. Raw data was viewed in Xcalibur v2.0.7 (Thermo Fisher Scientific, USA).

The LC-MS/MS raw data was processed with Proteome Discover 2.1 for peptide and protein identification using the embedded Sequest HT server with the following criteria: database, the UniProt bovine non-redundant proteome database (15-11-2019 version); enzyme, No specific enzyme was selected; maximum missed cleavages, 2; variable modifications included oxidation (Met), carbamidomethyl of cysteine, acetyl (protein N-terminus and lysine(K)), deamidation for Asn and Gln, phosphorylation (Ser, Thr, and Tyr). The MS and MS/MS results were searched with a precursor mass tolerance at 10 ppm and a MS/MS mass tolerance at 0.05 Da. The results were filtered in Proteome Discoverer with the integrated Percolator algorithm to ensure the false discovery rate (FDR) less than 0.01. Only peptides passed the default score versus charge state for Sequest HT were accepted.

The identified peptides from each sample were exported to an excel sheet and further manually processed and analysed. The processed data was further visualized to display the protein sequence localization and abundance using the on-line software Peptigram (http://bioware.ucd.ie/peptigram/).

The identified peptides was also searched against the bovine and human milk bioactive peptides database (BIO-PEP bioactive peptides database) to explore and discover the potential endogenous bioactive peptides.

The LCMS/MS workflow, peptidomic analysis and results of the database search are shown in FIGS. 9A, 9B, 10A, 10B, 11A and 11B.

Figure 9A:
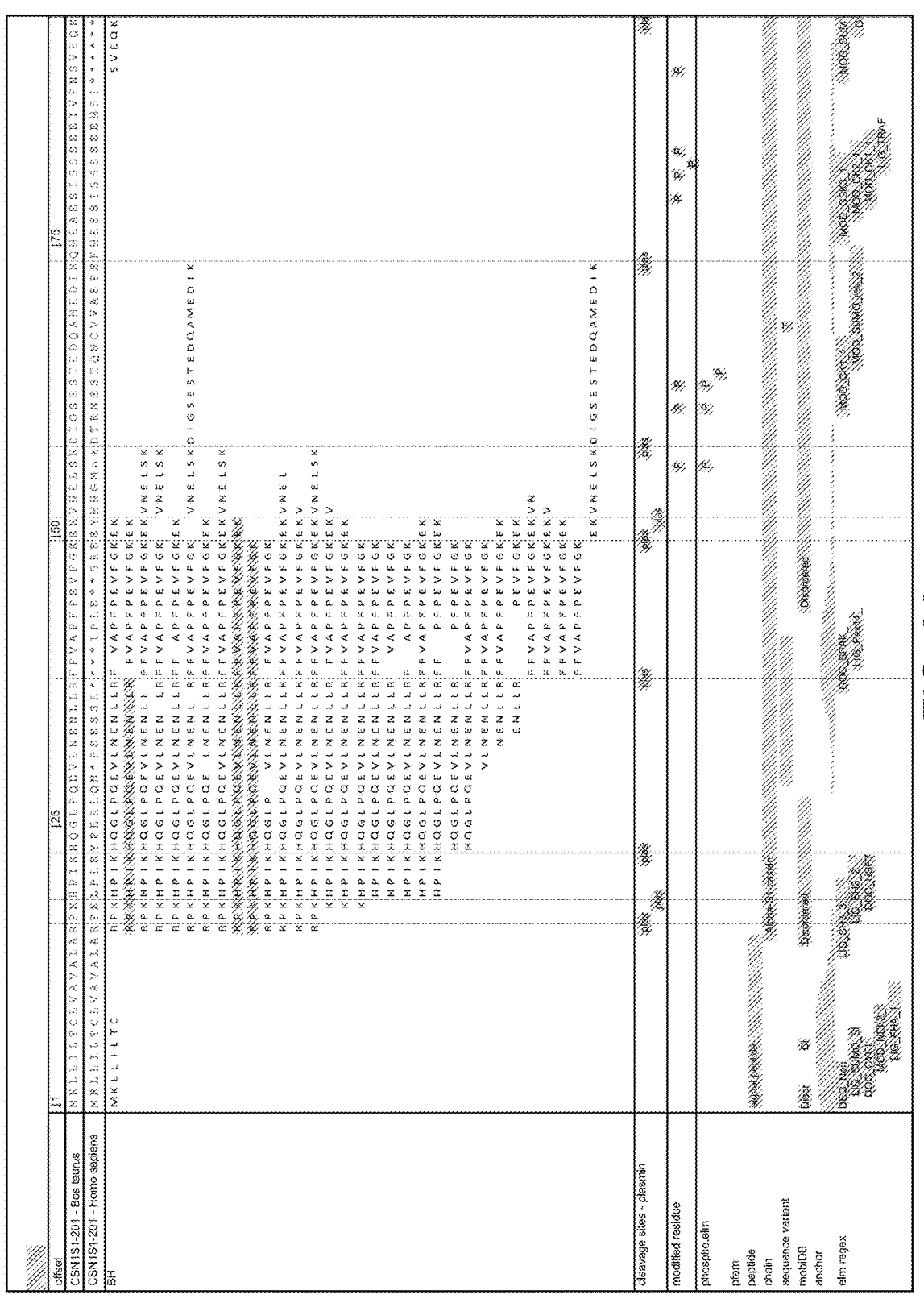
FIGS. 9A and 9B shows the identified peptides of α-S1-casein after hydrolysis of MCI.
Figure 9B:
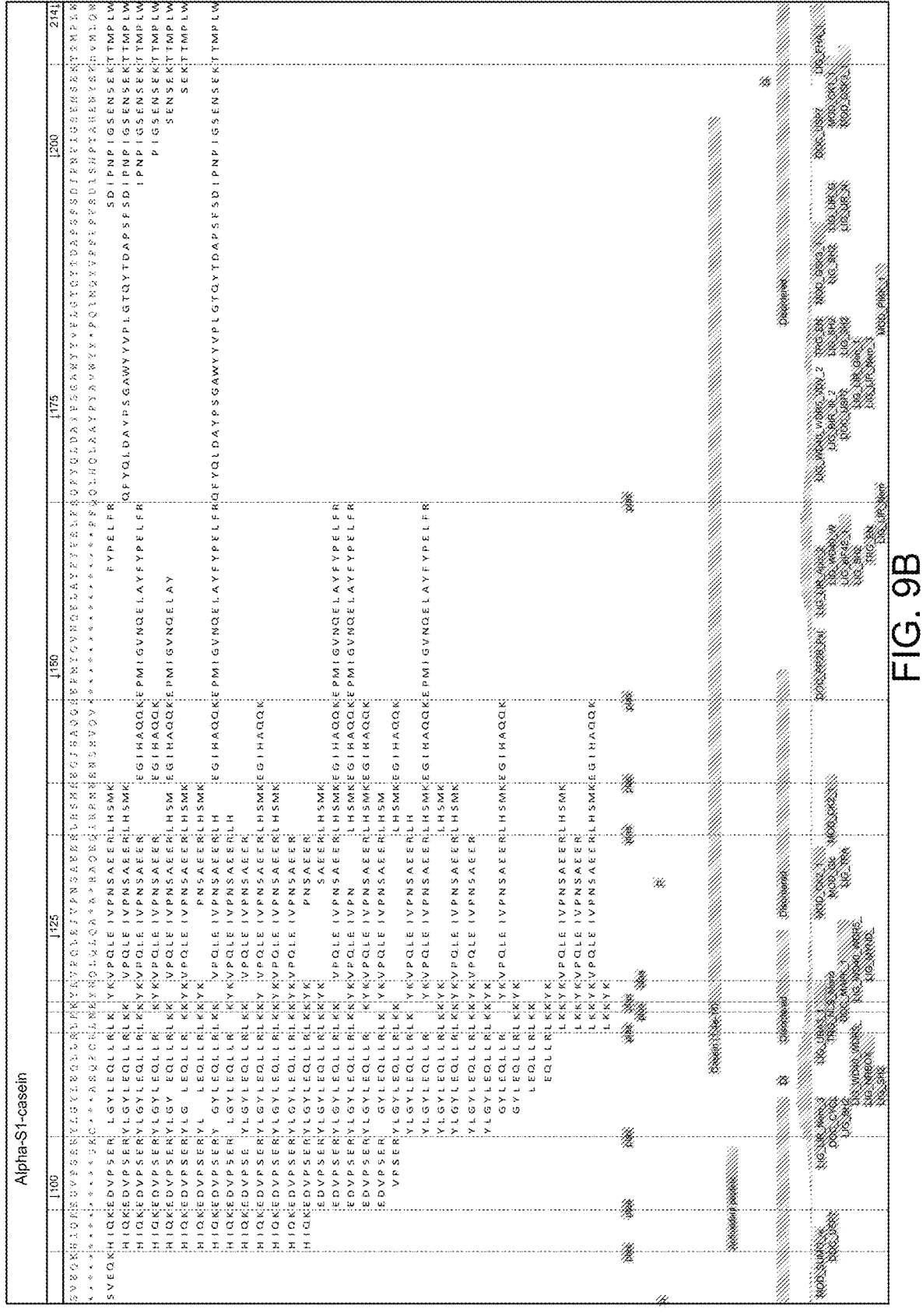

FIGS. 9A and 9B shows the identified peptides of α-S1-casein, where the dotted line represents the plasmin cleaving site.

Figure 10A:
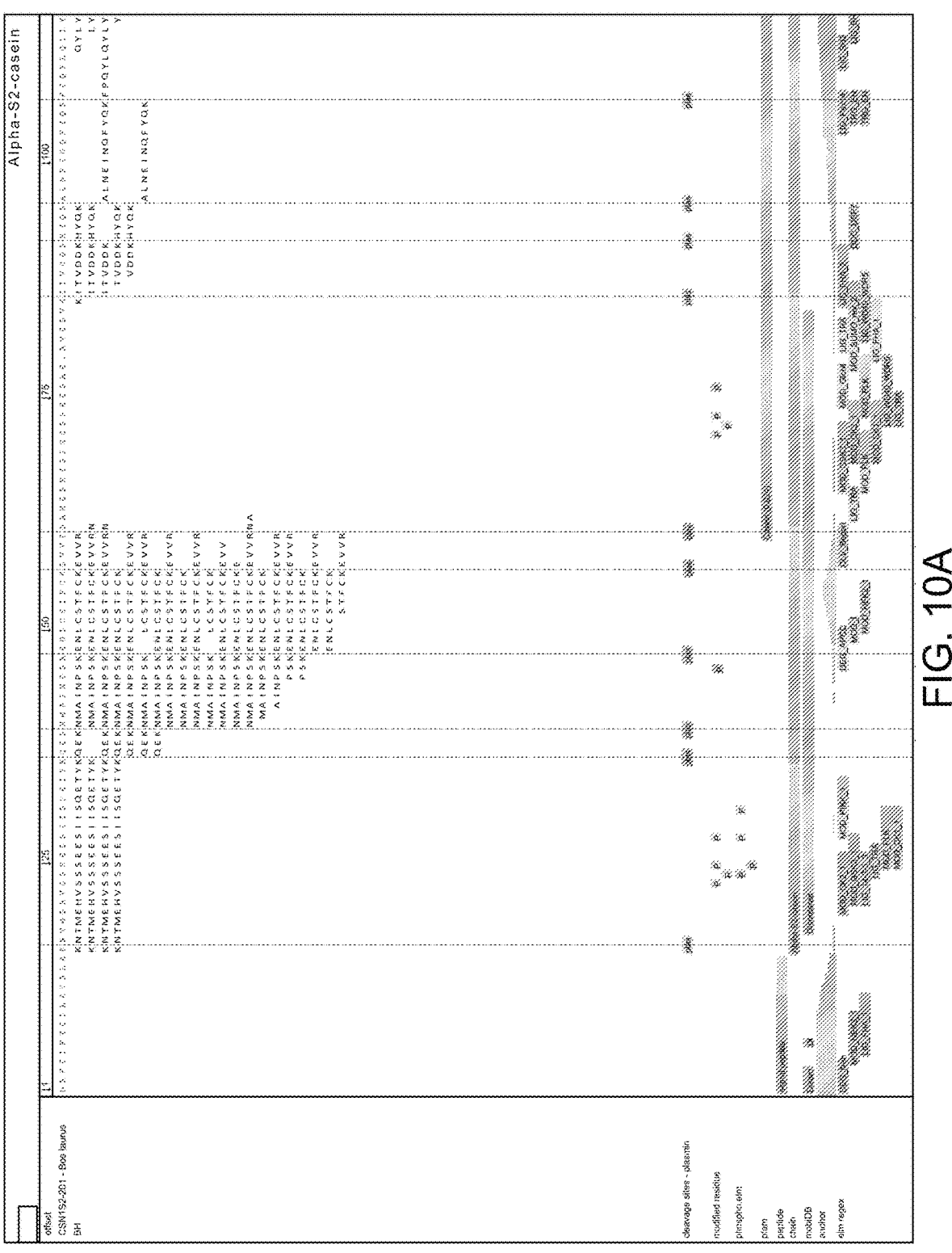
FIGS. 10A and 10B shows the identified peptides of α-S2-casein after hydrolysis of MCI.
Figure 10B:
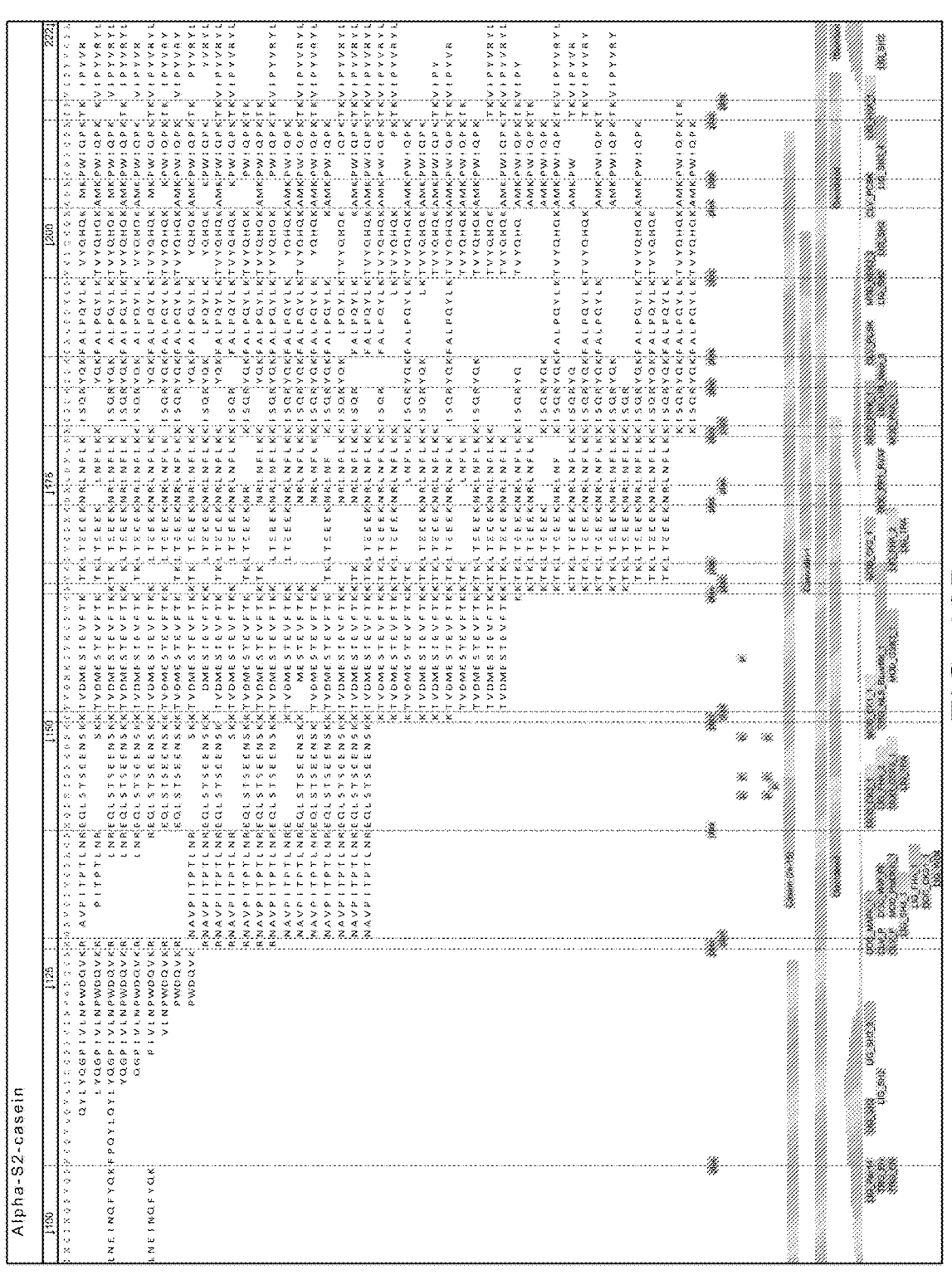

FIGS. 10A and 10B shows the identified peptides of α-S2-casein, and here the dotted line also represents the plasmin cleaving site.

Figure 11A:
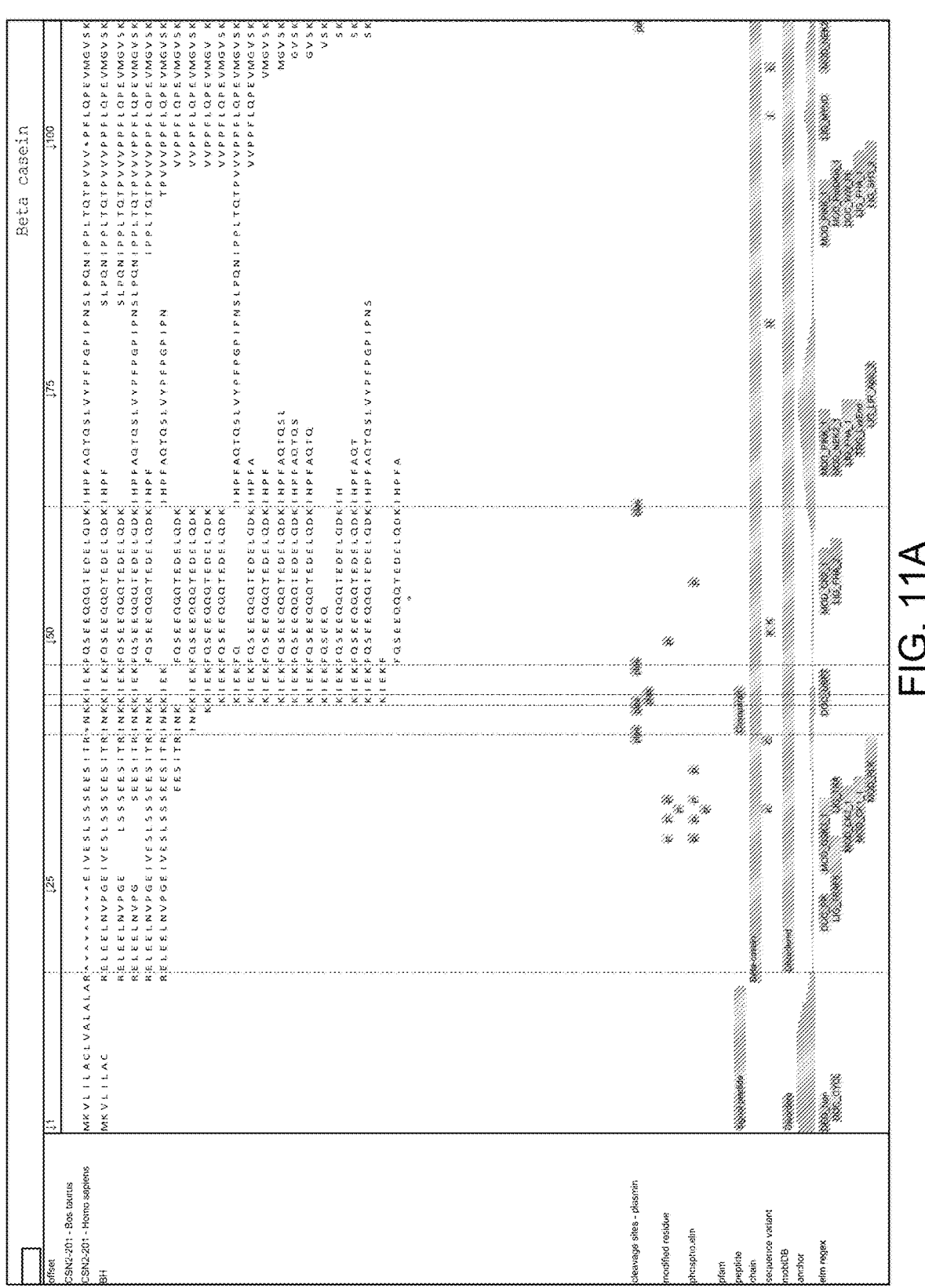
FIGS. 11A and 11B shows the identified peptides of β-casein after hydrolysis of MCI.
Figure 11B:
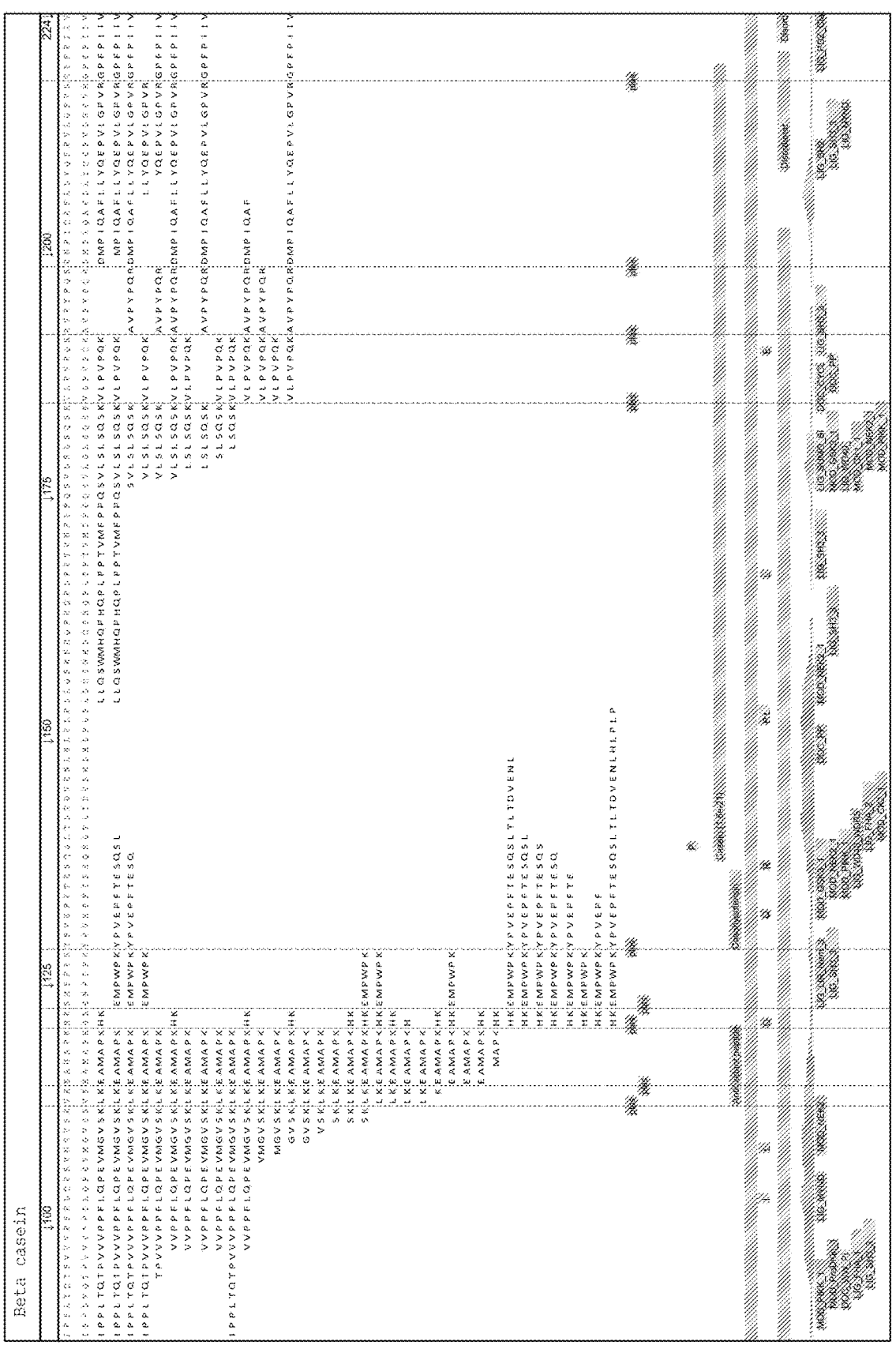

FIGS. 11A and 11B shows the identified peptides of β-casein, where the dotted line represents the plasmin cleaving site.

It is clear from FIGS. 9A, 9B, 10A, 101B, 11A and 11B that the overwhelming abundance of peptides are cleaved by plasmin or plasmin related enzymes on β-casein, α-S1-casein and α-S2-casein. Furthermore, 33 peptides with documented biological activity were identified via matching to the aforementioned database. These bio-active peptides are from α-S1-casein, α-S2-casein, β-casein, and Kappa-casein. Among these bio-active peptides, 15 peptides were annotated with ACE-inhibitory activity, and 16 peptides were annotated with antimicrobial activity in the aforementioned database. In table 4 below, the identified peptides from α-S1-casein, α-S2-casein, β-casein, and Kappa-casein and the biological activity are listed.

TABLE 4

| The list of identified peptides with documented biological activity | | | | | |
|---|---|---|---|---|---|
| Sequence | Modifications | Protein name | Positions in Master Proteins | Theo. MH+ [Da] | Bio-activity |
| FFVAPFPEVFGK | | Alpha-S1-casein | P02662 [38-49] | 1384.73 | ACE-inhibitory |
| AMKPWIQPK | | Alpha-S2-casein | P02663 [204-212] | 1098.613 | ACE-inhibitory |
| FALPQYLK | | Alpha-S2-casein | P02663 [189-196] | 979.5611 | ACE-inhibitory |
| PYVRYL | | Alpha-S2-casein | P02663 [217-222] | 810.4509 | ACE-inhibitory |
| MKPWIQPK | | Alpha-S2-casein | P02663 [205-212] | 1027.576 | ACE-inhibitory |

TABLE 4-continued

The list of identified peptides with documented biological activity

| Sequence | Modifications | Protein name | Positions in Master Proteins | Theo. MH+ [Da] | Bio-activity |
|---|---|---|---|---|---|
| AMKPWIQPK | 1 x Oxidation [M2] | Alpha-S2-casein | P02663 [204-212] | 1114.608 | ACE-inhibitory |
| ALNEINQFYQK | | Alpha-S2-casein | P02663 [96-106] | 1367.695 | ACE-inhibitory |
| MKPWIQPK | 1 x Oxidation [M1] | Alpha-S2-casein | P02663 [205-212] | 1043.571 | ACE-inhibitory |
| TVYQHQ | | Alpha-S2-casein | P02663 [197-202] | 775.3733 | ACE-inhibitory |
| AMKPW | | Alpha-S2-casein | P02663 [204-208] | 632.3225 | ACE-inhibitory |
| EMPFPK | | Beta-casein | P02666 [123-128] | 748.3698 | ACE-inhibitory |
| EMPFPK | 1 x Oxidation [M2] | Beta-casein | P02666 [123-128] | 764.3647 | ACE-inhibitory |
| YQEPVLGPVRGPFPIIV | | Beta-casein | P02666 [208-224] | 1881.063 | ACE-inhibitory |
| AVPYPQR | | Beta-casein | P02666 [192-198] | 830.4519 | ACE-inhibitory |
| FSDKIAK | | Kappa-casein | P02668 [39-45] | 808.4563 | ACE-inhibitory |
| FFSDK | | Kappa-casein | P02668 [38-42] | 643.3086 | Anticancer |
| RPKHPIKHQGLPQEVLNENLLRFFVAPFPEVFGK | | Alpha-S1-casein | P02662 [16-49] | 3982.197 | Antimicrobial |
| RPKHPIKHQGLPQEVLNENLLRFFVAPFPEVFGKEK | | Alpha-S1-casein | P02662 [16-51] | 4239.334 | Antimicrobial |
| HIQKEDVPSERYLGYLEQLLRLKK | | Alpha-S1-casein | P02662 [95-118] | 2955.641 | Antimicrobial |
| HIQKEDVPSERYLGYLEQLLRLKKYK | | Alpha-S1-casein | P02662 [95-120] | 3246.8 | Antimicrobial |
| HIQKEDVPSERYLGYLEQLLRLK | | Alpha-S1-casein | P02662 [95-117] | 2827.546 | Antimicrobial |
| RPKHPIKHQGLPQEVLNENLLRFF | | Alpha-S1-casein | P02662 [16-39] | 2910.621 | Antimicrobial |
| RPKHPIKHQGLPQEVLNENLLRF | | Alpha-S1-casein | P02662 [16-38] | 2763.553 | Antimicrobial |
| RPKHPIKHQGLPQEVLNENLLRFFVAPFPEVFGKEKV | | Alpha-S1-casein | P02662 [16-52] | 4338.403 | Antimicrobial |
| VLNENLLR | | Alpha-S1-casein | P02662 [30-37] | 970.568 | Antimicrobial |

TABLE 4-continued

The list of identified peptides with documented biological activity

| Sequence | Modifications | Protein name | Positions in Master Proteins | Theo. MH+ [Da] | Bio-activity |
|---|---|---|---|---|---|
| TKVIPYVRYL | | Alpha-S2-casein | P02663 [213-222] | 1251.746 | Antimicrobial |
| KTKLTEEEKNRLNFLKKISQRYQKFALPQYLKTVYQHQK | | Alpha-S2-casein | P02663 [165-203] | 4867.71 | Antimicrobial |
| KAMKPWIQPKTKVIPYVRYL | 1 × Phospho [T11]; 1 × Oxidation [M3] | Alpha-S2-casein | P02663 [203-222] | 2555.397 | Antimicrobial |
| HKEMPFPK | | Beta-casein | P02666 [121-128] | 1013.524 | Antimicrobial |
| VLPVPQK | | Beta-casein | P02666 [185-191] | 780.4978 | Antimicrobial |
| HKEMPFPK | 1 × Oxidation [M4] | Beta-casein | P02666 [121-128] | 1029.519 | Antimicrobial |
| VLPVPQKAVPYPQR | | Beta-casein | P02666 [185-198] | 1591.932 | Antimicrobial |
| YLGYLEQLLR | | Alpha-S1-casein | P02662 [106-115] | 1267.704 | Anxiolytic |

Example 7—Determination of Molecular Weight Distribution

A casein hydrolysate prepared according to the present invention was analysed for the size of the peptides present by determining the molecular weight distribution by the method described in example 1.3.

The result is shown in FIG. 12. FIG. 12 shows that more than 50% of the identified peptides of the casein hydrolysate of the present invention have molecular weight within the range of from 1000 to 3000 Da and the peptides having a molecular weight above 5000 Da are less than 1%.

Example 8—Effect of pH

The effect of pH on plasmin in the thermally processed MF retentate (MCI) was analysed.

Samples were made with 8% w/w MCI solution adjusted to a pH 6.8, 7.8 and 8.2, respectively, with NaOH and 0.05% NaN3. The samples was not subjected to UHT heat treatment, but subjected to hydrolysis at 38° C. The amount of beta-casein (beta-CN) and alpha-S1-casein (Alpha-S1-CN) was measured at start of the hydrolysis (time=0 hours), and again after 24 hours and 48 hours by HPLC. The HPLC method used was as described in example 1.1 except that the column used was Waters BioSuite C18 PA-B 3.5 μm, 2.1×250 mm (Waters #186002436) and the washing time between injection of each sample was 6.5 minutes.

In FIG. 13A is the effect on pH on hydrolysis of alpha-S1-casein shown, while the effect on hydrolysis of beta-casein is shown in FIG. 13B. FIGS. 13A and 13B clearly shows that the effect of endogeneous plasmin on hydrolys-ing casein (both beta-casein and alpha-S1-casein) is optimal at pH 7.5-8.2 and less efficient when pH is 6.8 that is the pH of natural milk. After 48 hours of hydrolysis, the amount of intact alpha-S1-casein is 40-50% when pH is 7.8-8.2, while the amount of alpha-S1-casein after 48 hours of hydrolysis is about 68% when pH is 6.8. Similarly, the amount of beta-casein after 48 hours of hydrolysis is lower when pH 7.8-8.2 is used as compared to pH 6.8.

The invention claimed is:

1. A method of preparing a casein hydrolysate for a nutritional composition comprising:
   i. providing a liquid solution comprising casein and endogenous plasmin, wherein the liquid solution comprises at least 90% by weight casein of the total protein content and wherein the liquid solution comprises whey protein in an amount of maximum 10% by weight of the total protein content, and wherein the source of casein and the endogenous plasmin is a milk product selected from the group consisting of a micellar casein isolate (MCI), micellar casein concentrate (MCC), micellar casein retentate (MCR), beta-casein depleted micellar casein isolate, beta-casein depleted micellar casein concentrate, milk protein concentrate (MPC), and microfiltration retentate of a milk product;
   ii) adjusting the pH of the solution of step i) to a pH 7.2 to 9;
   iii) subjecting the pH adjusted solution to a first heat treatment to inactivate microorganisms, wherein the first heat treatment is at a temperature of 85° C. to 180° C. for a period of 0.1 to 30 seconds;
   iv) subjecting the solution of step iii) to a second heat treatment at a temperature of from 25° C. to 45° C. for at least 6 hours to obtain a casein hydrolysate, and
   wherein the method excludes addition of exogenous enzymes.

2. The method according to claim 1, wherein the pH adjusted solution of step ii) is homogenized.

3. The method according to claim 1, wherein the first heat treatment in step iii) comprises heating to a temperature above 120° C. for a period of 0.1 to 10 seconds.

4. The method according to claim 1, wherein the first heat treatment in step iii) comprises heating to a temperature of from 120° C. to 180° C. for 0.1 to 10 seconds.

5. The method according to claim 1, wherein the first heat treatment is selected from ultra-high temperature (UHT) heat treatment or high pressure sterilization.

6. The method according to claim 1, wherein the liquid solution comprising casein and endogenous plasmin comprises a milk fraction from bovine milk.

7. The method according to claim 1, wherein the liquid solution provided in step i) comprises casein in an amount of at least 1% w/v.

8. The method according to claim 7, wherein the liquid solution provided in step i) comprises casein in an amount of from 1% w/v to 20% w/v.

9. A natural casein hydrolysate for a nutritional composition obtainable by the method according to claim 1, wherein the casein hydrolysate does not comprise added exogenous enzymes, the casein hydrolysate comprises at least 90% by weight hydrolysed casein of the total protein content and comprises whey protein in an amount of maximum 10% by weight of the total protein content.

10. The natural casein hydrolysate according to claim 9, wherein the casein hydrolysate comprises peptides, where at least 50% of the peptides have a molecular weight of 1000 to 3000 Da and less than 1% of the peptides have a molecular weight of 5000 Da or above.

11. A method of making a nutritional composition comprising incorporating the natural casein hydrolysate made according to the method of claim 1 into a nutritional composition.

* * * * *